United States Patent
Mather et al.

(10) Patent No.: US 10,124,210 B2
(45) Date of Patent: Nov. 13, 2018

(54) SYSTEMS AND METHODS FOR QUALITATIVE ASSESSMENT OF SPORTS PERFORMANCE

(71) Applicant: KO Luxembourg SARL, Luxembourg (BE)

(72) Inventors: Geoffrey Mather, Albuquerque, NM (US); Jeffrey Collins, Albuquerque, NM (US); Mark Ries Robinson, Albuquerque, NM (US); Petras Avizonis, Boston, MA (US); Erik Andries, Albuquerque, NM (US); Johann Ammerlahn, San Diego, CA (US); Elena Allen, Albuquerque, NM (US); Paul Loftsgard, San Diego, CA (US); Adrey Dolgov, San Diego, CA (US)

(73) Assignee: KO Luxembourg SARL, Luxembourg (BE)

( * ) Notice: Subject to any disclaimer, the term of this patent is extended or adjusted under 35 U.S.C. 154(b) by 71 days.

(21) Appl. No.: 15/067,842

(22) Filed: Mar. 11, 2016

(65) Prior Publication Data
US 2016/0263458 A1 Sep. 15, 2016

Related U.S. Application Data

(60) Provisional application No. 62/132,614, filed on Mar. 13, 2015, provisional application No. 62/132,598, filed on Mar. 13, 2015.

(51) Int. Cl.
*A63B 24/00* (2006.01)
*A63B 71/14* (2006.01)
(Continued)

(52) U.S. Cl.
CPC ........ *A63B 24/0062* (2013.01); *A63B 71/145* (2013.01); *G06K 9/0055* (2013.01);
(Continued)

(58) Field of Classification Search
CPC .............. A63B 24/0062; A63B 71/145; A63B 69/0002; A63B 69/002; A63B 69/0024;
(Continued)

(56) References Cited

U.S. PATENT DOCUMENTS 3,920,242 A 11/1975 Reith et al.
4,761,005 A 8/1988 French et al.
(Continued)

FOREIGN PATENT DOCUMENTS

GB 2321003 7/1998
GB 2328605 3/1999
(Continued)

*Primary Examiner* — Andrew S Lo
(74) *Attorney, Agent, or Firm* — Finnegan, Henderson, Farabow, Garrett & Dunner LLP

(57) ABSTRACT

One or more processors may be configured to receive, via a radio from one or more sensors, one or more streams of sensor values indicating: (1) accelerations of a boxer's arm within a first range of acceleration, measured by a first acceleration sensor, (2) accelerations of a boxer's arm within a second range of acceleration, measured by a second acceleration sensor, and (3) rotation of the boxer's arm measured by a gyroscope sensor. The one or more processors may be configured to determine, based on the received sensor values from the first acceleration sensor, whether a punch landed but not to measure a force or velocity of the punch. The one or more processors may be configured to determine, based on the received sensor values from the second acceleration sensor, at least one of a force or a velocity of the punch but not to detect whether the punch landed.

26 Claims, 26 Drawing Sheets

(51) Int. Cl.
*G06K 9/00* (2006.01)
*A63B 69/00* (2006.01)
*A63B 71/06* (2006.01)

(52) U.S. Cl.
CPC ........ *G06K 9/00355* (2013.01); *A63B 69/002* (2013.01); *A63B 69/0002* (2013.01); *A63B 69/004* (2013.01); *A63B 69/0024* (2013.01); *A63B 71/0669* (2013.01); *A63B 2220/16* (2013.01); *A63B 2220/24* (2013.01); *A63B 2220/30* (2013.01); *A63B 2220/44* (2013.01); *A63B 2220/53* (2013.01); *A63B 2220/805* (2013.01); *A63B 2220/836* (2013.01); *A63B 2225/02* (2013.01); *A63B 2225/20* (2013.01); *A63B 2225/50* (2013.01); *A63B 2230/06* (2013.01); *A63B 2230/42* (2013.01); *A63B 2230/436* (2013.01); *A63B 2230/60* (2013.01); *A63B 2244/102* (2013.01); *A63B 2244/106* (2013.01); *A63B 2244/108* (2013.01)

(58) Field of Classification Search
CPC .............. A63B 69/004; A63B 71/0669; A63B 2220/16; A63B 2220/24; A63B 2220/30; A63B 2220/44; A63B 2220/53; A63B 2220/805; A63B 2220/836; A63B 2225/02; A63B 2225/20; A63B 2225/50; A63B 2230/06; A63B 2230/42; A63B 2230/436; A63B 2230/60; A63B 2244/102; A63B 2244/106; A63B 2244/108; G06K 9/00355; G06K 9/0055
USPC .......................................................... 482/8
See application file for complete search history.

(56) References Cited

U.S. PATENT DOCUMENTS

| | | |
|---|---|---|
| 4,763,275 A | 8/1988 | Carlin |
| 4,763,284 A | 8/1988 | Carlin |
| 4,824,107 A | 4/1989 | French |
| 4,833,271 A | 11/1989 | French |
| 4,941,660 A | 7/1990 | Winn et al. |
| 5,184,831 A | 2/1993 | Garner |
| 5,232,223 A | 8/1993 | Dornbusch |
| 5,516,105 A | 5/1996 | Eisenbery et al. |
| 5,592,401 A | 1/1997 | Kramer |
| 5,605,336 A | 2/1997 | Gaoiran |
| 5,723,786 A | 3/1998 | Klapman |
| 5,978,972 A | 11/1999 | Stewart et al. |
| 6,056,674 A | 5/2000 | Cook |
| 6,126,572 A | 10/2000 | Smith |
| 6,162,123 A | 12/2000 | Woolston |
| 6,183,365 B1 | 2/2001 | Tonomura et al. |
| 6,308,578 B1 | 10/2001 | Derose |
| 6,397,151 B1 | 5/2002 | Yamagishi et al. |
| 6,585,593 B1 | 7/2003 | Okano et al. |
| 6,611,782 B1 | 8/2003 | Wooster et al. |
| 6,925,851 B2 | 8/2005 | Reinbold et al. |
| 7,384,380 B2 | 6/2008 | Reinbold et al. |
| 8,622,795 B2 | 1/2014 | Edis et al. |
| 2007/0015637 A1 | 1/2007 | Penner et al. |
| 2009/0235761 A1* | 9/2009 | Song .................... A63B 69/004 73/862.59 |
| 2010/0144414 A1* | 6/2010 | Edis .................... A63B 24/0006 463/8 |
| 2010/0194879 A1* | 8/2010 | Pasveer ................ A61B 5/1127 348/135 |
| 2012/0053016 A1* | 3/2012 | Williamson ....... A63B 24/0062 482/8 |
| 2012/0108394 A1* | 5/2012 | Jones .................... A63B 69/004 482/8 |
| 2013/0282155 A1* | 10/2013 | Li ...................... A63B 24/0062 700/91 |
| 2014/0106833 A1* | 4/2014 | Mohn ................ A63B 24/0006 463/8 |
| 2014/0372440 A1* | 12/2014 | Cains .................. A63B 71/145 707/737 |

FOREIGN PATENT DOCUMENTS

| | | |
|---|---|---|
| JP | 02-156968 | 6/1990 |
| JP | 09-285581 | 11/1997 |
| SU | 11-598613 | 3/1978 |
| WO | WO 99/10052 | 4/1999 |

* cited by examiner

Audience Information

Punch Metrics

Type: Right Cross
Speed: 18 miles/hr
Impact Force: 285 LBS of force

Fight Information

| Left Hand | Right Hand |
|---|---|
| Jab: 56 | Cross: 32 |
| Hook: 20 | Hook: 17 |
| Uppercut: 19 | Uppercut: 12 |

Max Punch: 500 LBS
Force Totals
  Fight = 6000 lbs.
  Round 1 = 4000 lbs.
  Round 2 = 2000 lbs.
Average Punch Speed
  Left Hand = 15 mph
  Right Hand = 20 mph

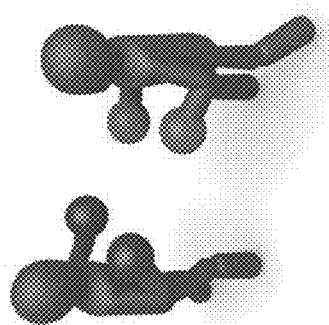

Punch Metrics

Type: Right Cross
Speed: 18 miles/hr
Impact Force: 285 LBS of force

Fight Information

| Left Hand | Right Hand |
|---|---|
| Jab: 56 | Cross: 32 |
| Hook: 20 | Hook: 17 |
| Uppercut: 19 | Uppercut: 12 |

Max Punch: 500 LBS
Force Totals
  Fight = 6000 lbs.
  Round 1 = 4000 lbs.
  Round 2 = 2000 lbs.
Average Punch Speed
  Left Hand = 15 mph
  Right Hand = 20 mph

FIG. 9

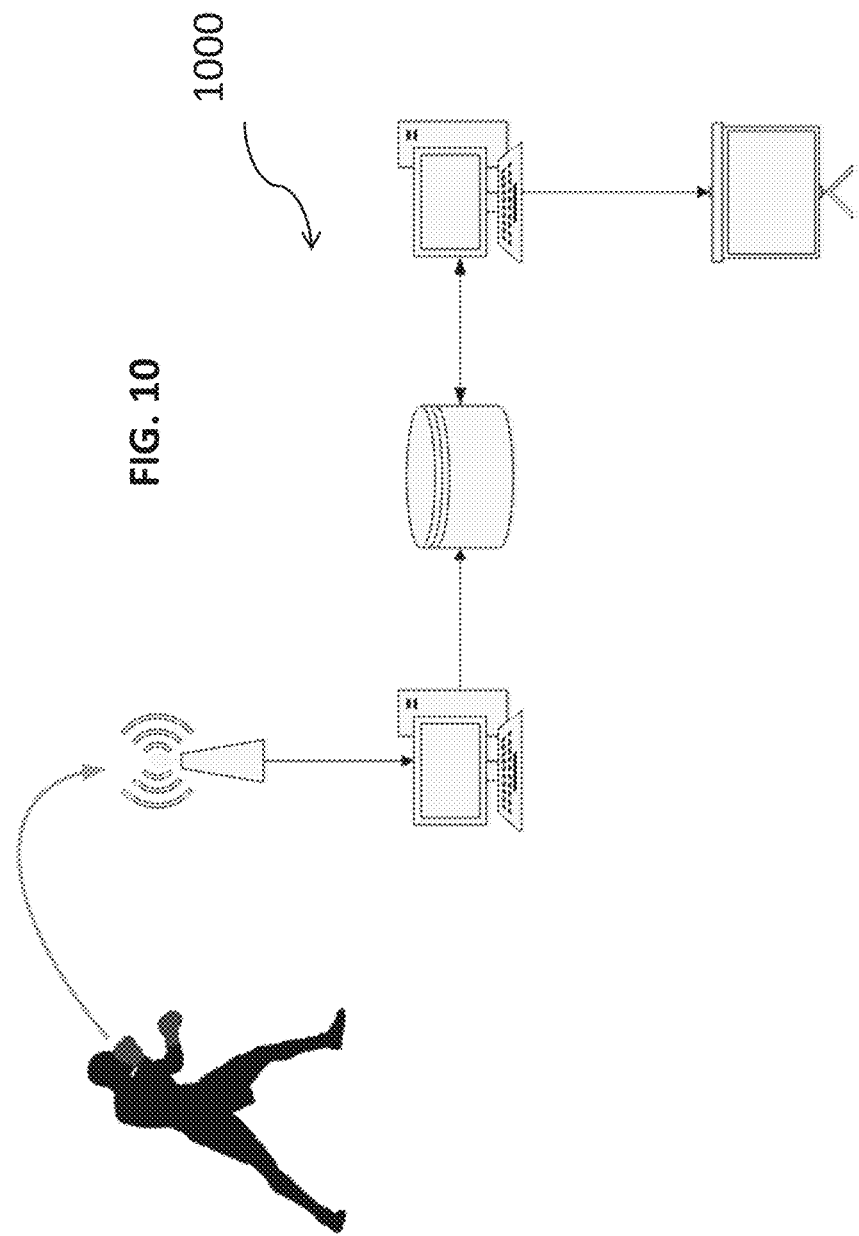

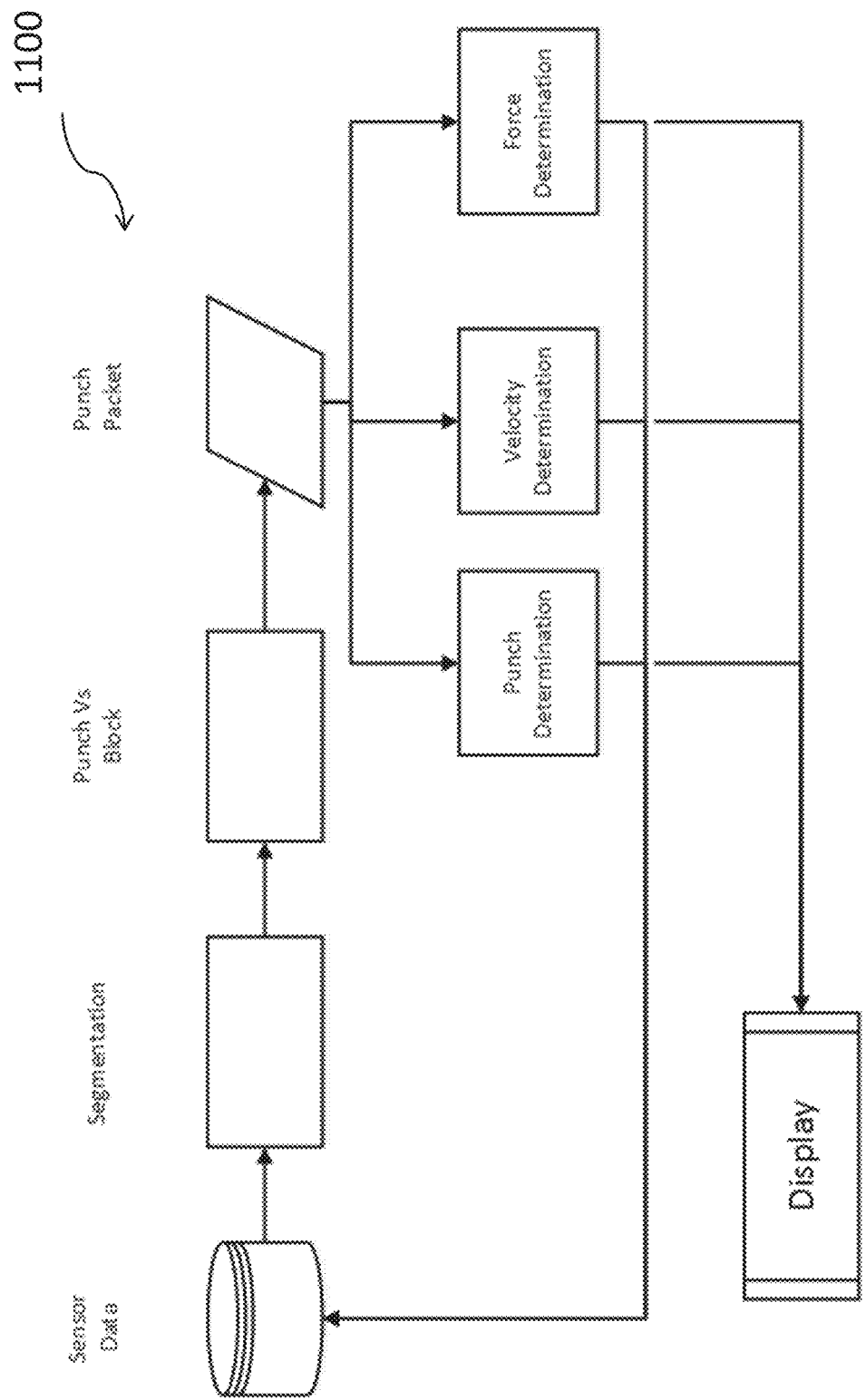

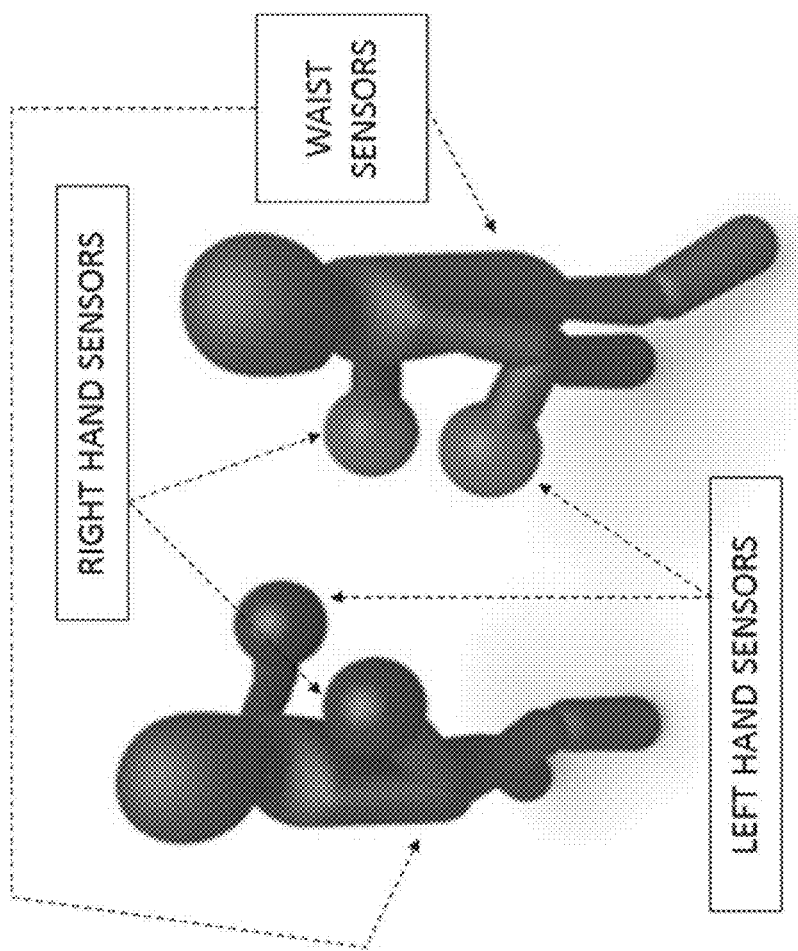
FIG. 12 Sensor Placement

Typical 3D Displacement Graph of a Single maximal Punch. The target is for illustrative purposes only.

FIG. 22

Punch Recognition Performance Results

Enrollment Results

| PREDICTED | Left Jab | Left Hook | Left Upper Cut | Right Cross | Right Hook | Right Upper Cut | % Accuracy |
|---|---|---|---|---|---|---|---|
| Left Jab | 60 | | | | | | 60/60 = 100% |
| Left Hook | | 60 | | | | | 60/60 = 100% |
| Left Upper Cut | | | 60 | | | | 60/60 = 100% |
| Right Cross | | | | 60 | | | 60/60 = 100% |
| Right Hook | | | | | 60 | | 60/60 = 100% |
| Right Uppercut | | | | | | 60 | 60/60 = 100% |
| REFERENCE | | | | | | | 100)% |

SYSTEMS AND METHODS FOR QUALITATIVE ASSESSMENT OF SPORTS PERFORMANCE

This non-provisional patent application claims the benefit of priority to U.S. Provisional Patent Application No. 62/132,614, entitled "Systems and Methods for Quantitative Assessment of Sports Performance" and to U.S. Provisional Patent Application No. 62/132,598, entitled "Sensor System and Methods", both filed on Mar. 13, 2015. The contents of both provisional applications are incorporated herein by reference their entireties.

BACKGROUND INFORMATION

The described embodiments relate to systems and methods for the quantitative assessment of boxer performance, including by processing accelerometer and/or gyroscopic data from the boxer for determining relevant performance parameters.

Conventional methods for assessing boxing performance include visual observation by an experienced observer. Specifically, the typical broadcast of a boxing fight involves several commentators providing commentary on, and/or judges determining, the type of punch thrown, whether contact was established, and the perceived subjective impact of the punch. The information provided to the audience is devoid of any quantitative measurements based upon the physical actions and movement of the boxer(s).

There is a need for an accurate way to measure impact forces during combat sports, such as boxing, wrestling, kickboxing, martial arts, and mixed martial arts. Among other things, reporting impact forces can enhance a viewer's enjoyment of the sport, aid judges in evaluating a round or match, help trainers develop appropriate training regimens, allow medical professionals to recommend treatment and training options for sports participants, and permit new types of betting, such as betting on which participant will land a blow with the strongest force. There is also a need to accurately detect specific body motions or gestures, such as the types of punches thrown in a boxing match, and peak punch or kick velocity, both of which provide many of the same benefits mentioned for detecting impact forces. To date there has not been a system that adequately performs these functions. Embodiments disclosed below overcome one or more of these problems in the art.

SUMMARY

Exemplary systems and methods described herein provide a mechanism to quantitatively assess the performance of a boxer during training or during a fight. The system provides a mechanism for effective data capture followed by methodologies that enable determining the type of punch thrown, the velocity of the punch, and the force of the punch. Cumulative metrics can also be calculated such as average speed, cumulative force, etc.

In particular, the systems and methods described herein may provide a quantitative performance assessment based upon the physical motions of the boxer as measured by sensors, including accelerometers, gyroscopic meters, and/or magnetometers. The physical motion of the boxer may be characterized by these sensors placed in the gloves and/or on the waist of the boxer. This information may be transmitted to an appropriate data capture system for processing. A multitude of quantitative assessments may be provided based upon a single punch, a punch combination, cumulative information for the last round, and longer-term historical performance. Exemplary primary assessments may include: 1) identifying the arm that initiates the punch, 2) the type of punch thrown, 3) the velocity of the punch, and 4) the force generated by the punch. These quantitative assessments can be displayed in dashboards such as that shown in FIG. 9.

One aspect of the disclosure relates to a punch sensor. The punch sensor may have a first acceleration sensor for measuring a first range of acceleration of a boxer's arm, wherein the first acceleration sensor is used to detect that a punch has landed but not to determine a speed or a force of the punch. The punch sensor may also have a second acceleration sensor for measuring a second range of acceleration of the boxer's arm, wherein the second acceleration sensor is used to determine at least one of the speed or the force of the punch but not to detect that a punch has landed. The punch sensor may also have a processor configured to receive the measurements of the first range of acceleration from the first acceleration sensor and to receive the measurements of the second range of acceleration from the second acceleration sensor.

Another aspect of the disclosure relates to a boxing data server. The boxing data server may have a memory storing predetermined profiles of arm acceleration or rotation over time for one or more types of punches, and a radio for communicating with one or more punch sensors on one or more boxers and receiving sensor values from the one or more punch sensors. The server may also have one or more processors configured to receive, via the radio from the one or more sensors, one or more streams of sensor values indicating accelerations of a boxer's arm or rotation of the boxer's arm within a first range of acceleration, measured by a first acceleration sensor or a gyroscope sensor, and receive values indicating accelerations of a boxer's arm or rotation of the boxer's arm within a second range of acceleration, measured by a second acceleration sensor or a second gyroscope sensor. The one or more processors may be further configured to determine, based on the received sensor values from the first acceleration sensor, whether a punch landed but not to measure a force or velocity of the punch; and to determine, based on the received sensor values from the second acceleration sensor, the force or velocity of the punch but not to detect whether the punch landed.

Another aspect relates to another embodiment of a boxing data server. The boxing data server may have a radio for communicating with one or more punch sensors on one or more boxers and receiving sensor values from the one or more punch sensors. The server may also have one or more processors configured to receive, via the radio, sensor values indicating: (1) accelerations of a boxer's arm within a first range of acceleration, measured by a first acceleration sensor, (2) accelerations of a boxer's arm within a second range of acceleration, measured by a second acceleration sensor, and (3) rotation of the boxer's arm measured by a gyroscope sensor. The one or more processors may be further configured to determine, based on the received sensor values from the first acceleration sensor, whether a punch landed but not to measure a force or velocity of the punch. The one or more processors may be further configured to determine, based on the received sensor values from the second acceleration sensor, at least one of a force or a velocity of the punch but not to detect whether the punch landed. The one or more processors may be further configured to determine, based on comparison of variations in the rotation of the boxer's arm and on variations in the acceleration of the boxer's arm measured by the second acceleration sensor to known punch gestures, a type of the punch.

BRIEF DESCRIPTION OF THE DRAWINGS

FIG. 9 illustrates exemplary boxer performance information that could be made available to an audience, consistent with one or more disclosed embodiments.

FIG. 10 illustrates an exemplary system architecture consistent with one or more disclosed embodiments.

FIG. 11 illustrates an exemplary processing architecture used by the system architecture of FIG. 9.

FIG. 12 illustrates exemplary sensor placement on boxers, consistent with one or more disclosed embodiments.

FIG. 22 illustrates an exemplary matrix showing effective punch type identification.

DETAILED DESCRIPTION

Reference will now be made in detail to exemplary embodiments, examples of which are illustrated in the accompanying figures. The following description refers to the accompanying figures in which the same numbers in different drawings represent similar elements unless otherwise stated. The implementations set forth in the following description of exemplary embodiments do not represent all implementations consistent with the disclosure. Instead, they are merely examples of systems and methods consistent with aspects related to the disclosure as recited in the appended claims.

The disclosed embodiments are directed to a sensing system 100 for electronically measuring and characterizing blows landed by athletes engaged in a sporting activity. Information about the blows may be provided to an audience, judges, trainers, coaches, healthcare providers, sports sanctioning or licensing bodies, ranking authorities, or other interested parties. Although the description focuses primarily on boxers 102 participating in a match or training environment, the systems, principles and methods may be applied to other activities or sports as well. For example, some or all aspects may apply to other martial arts (e.g., mixed martial arts, kickboxing), football, hockey, weightlifting, baseball, or other activities that involve impacts between participants themselves or between participants and equipment, where providing information about velocity, acceleration, and impact forces is useful.

In operation, the physical motion of the boxer may be sensed via accelerometer and gyroscopic sensors placed on the boxer. This sensed information may be wirelessly transferred to a data analysis system and then processed by the data analysis system. Alternatively, the sensed information may be processed on the boxer before wireless transmission.

Punch Sensing System and Sensor Placement

Figure 1:
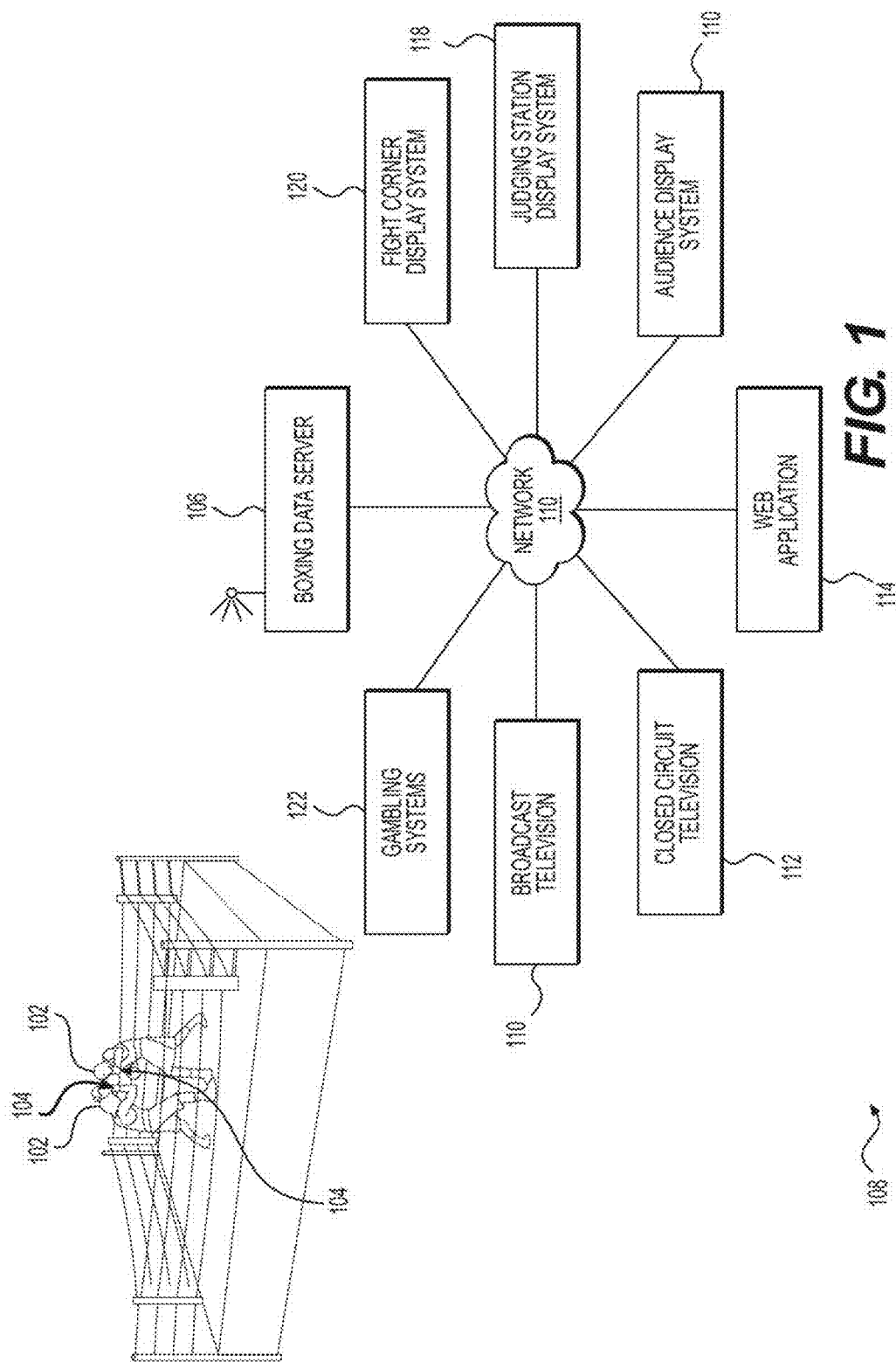
FIG. 1 illustrates an exemplary sensor system consistent with one or more disclosed embodiments.

As shown in FIG. 1, sensing system 100 may include sensing equipment 104 worn by each boxer 102. The sensing system 100 may be in wireless communication with a boxing data server 106. As discussed below, sensing equipment 104 may measure punches and other boxer movements and communicate data about the measurements to boxing data server 106. Boxing data server 106 may process the data, store the data, and make the stored data available for access by one or more third parties 108 over a network 110. The network may include the Internet, a local network, a cellular network, a personal area network, and/or other type of electronic network. Third parties 108 may include any entity that provides or uses information about punches landed by boxers during a match or training session for audience entertainment, judging, training, coaching, or other purposes. For example, third parties 108 may include broadcast television 110, closed circuit television 112, web applications 114, audience display systems 116 (e.g., at the arena), judging station display systems 118, fight corner display systems 120, gambling systems 122, sports ranking authorities (not shown), sports sanctioning bodies (not shown), etc. Based on punch data received from boxing data server 106, third parties 108 may facilitate display of punch statistics, such as the force, velocity, punch type, and/or the summary information over a match, round, or training session. These and other applications are discussed below.

Figure 2:
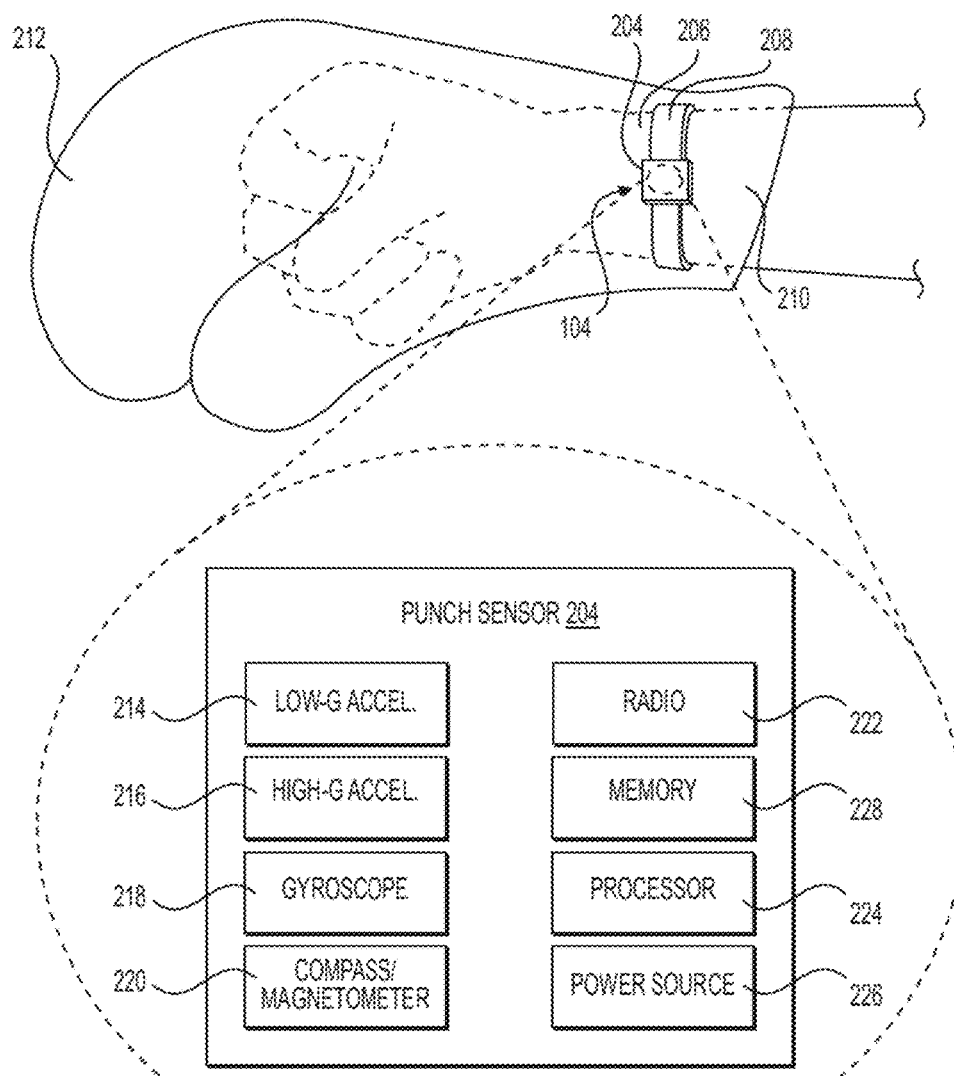
FIG. 2 illustrates an exemplary punch sensor consistent with one or more disclosed embodiments.

As shown in FIG. 2, sensing equipment 104 may be worn by boxer 102 to measure the movement of boxer 102's arm when punching or otherwise moving. Depending upon the particular information desired, sensing equipment 104 may be worn on one or both arms, and/or by one or both boxers 102. In one embodiment, punch sensor 204 may be fastened to boxer 102's wrist or forearm 206 using a strap 208. Punch sensor 204 may be worn under a cuff 210 of boxing glove 212, and may be of suitably small size and/or weight (e.g., 1"×1"×⅛", and 1 ounce) to minimize potential interference with a match or training session, improve boxer comfort, or comply with boxing regulations. For similar reasons, sensing equipment 104 and/or punch sensor 204 may alternatively be affixed to boxer 102 in other ways, and/or have other dimensions or configurations. For example, sensing equipment 104 and/or punch sensor 202 may be integrated within boxing glove 212, headgear (not shown), clothing, or other items worn or carried by boxer 102.

As shown in FIG. 2, punch sensor 204 may have a first acceleration sensor 214 for measuring a low range of acceleration/deceleration of boxer 102's arm and a second acceleration sensor 216 for measuring a high range of acceleration/deceleration of boxer 102's arm. In one embodiment, first acceleration sensor 216 may be used to detect when boxer 102 lands an intentional punch on an opponent or piece of equipment. For example, first acceleration sensor 216 may have a valid range such that it saturates (reaches its maximum measurable acceleration/deceleration) when an intentional punch lands (e.g., +/−16G, where "G" refers to a unit of acceleration equal to the acceleration caused by the Earth's gravity) but does not saturate when boxer 102 makes "probing" or "ranging" motions that impart less acceleration/deceleration. Accordingly, first acceleration sensor 216 may be used to determine that a punch has landed, but not to determine the force of the impact. Second acceleration sensor 218, on the other hand, may be used to measure the force of the impact of the punch. Accordingly, second acceleration sensor 218 may have valid range such that it does not saturate under the acceleration/decelerations experienced by a boxer 102's arm when a punch impacts (e.g., +/−200G).

In one embodiment, acceleration sensors 214, 216 may measure acceleration/deceleration in three dimensions and output a signal indicating the values of the acceleration/deceleration in each dimension and/or an overall scalar magnitude of the acceleration/deceleration. In one embodiment, acceleration sensors 214, 2016 may be triple-axis (i.e., 3-dimensional) microelectronic mechanical (MEMS) accelerometers or other devices suitable for wearable fitness applications. It will be appreciated that different sensor configurations may be employed, depending upon the desired application. For example, first acceleration sensor 214 may be omitted, and second acceleration sensor 216 may be used to both detect the punch and measure its impact. In another example, single-dimensional acceleration sensors may be used instead of three-dimensional acceleration sensors.

Continuing with FIG. 2, punch sensor 204 may further include a gyroscope sensor 218. In one embodiment, gyroscope sensor 218 may be configured to measure rotation around its own X, Y, and Z axes (roll, pitch, and yaw), and output digital or analog signals indicative of the measured values.

Punch sensor 204 may also include a direction sensor 220. Direction sensor 220 may include a compass device and/or a magnetometer, and may be configured to identify magnetic north and the direction of gravity. Direction sensor 220 may output signal(s) indicative of a heading relative to magnetic north and the direction of gravity. This signal and the signal of gyroscope sensor 218 may enable punch sensor 204 to determine the rotation of boxer 102's arm in the X, Y, and Z axes (i.e., roll, pitch, and yaw) of a "real world" coordinate system.

Although sensors 214-220 are described separately, they may be integrated into a signal device. For example, sensors 214-220 may be embodied as a MEMS system-on-a-chip package containing 3-D accelerometer(s), a 3-D gyroscope, and a 3-D compass/magnetometer suitable for wearable fitness applications.

Punch sensor 204 may also include radio 222. Radio 222 may be any device configured to receive data from processor 224 and wirelessly transmit the data to boxing data server 106. For example, radio 222 may operate in the 2.4 GHz and/or 5 GHz industrial, scientific, and medical (ISM) radio bands (i.e., WiFi). This configuration may provide adequate bandwidth for data transmission, as well as agility for changing transmission frequency when spectrum crowding causes interference, which may occur in a crowded arena where many other radio devices are present. Radio 222 may alternatively or additionally include a shortwave radio, such as a Bluetooth or Bluetooth Low Energy (Bluetooth LE) radio, for communicating data to boxing data server 106 over shorter distances (e.g., less than 300 ft.) A shortwave radio may reduce the power consumption of punch sensor 204, allowing a smaller power source 226 (e.g., a battery) and, thus, a smaller and lighter package, to be used. In some embodiments, radio 222 may alternatively or additionally include a cellular radio such as a Global System for Mobile Communications (GSM), a $2^{nd}$ Generation (2G), a $3^{rd}$ Generation (3G), a $3^{rd}$ Generation Long Term Evolution (LTE), and/or $4^{th}$ Generation (4G) radio for communicating with boxing data server 106

Memory 228 may include any suitable type or combination of devices or components for storing data received by processor 224. For example, memory 228 may include any combination of random access memory (RAM), read-only memory (ROM), magnetic storage, solid state storage, etc.

Processor 224 may include any general-purpose or special-purpose computer microprocessor configured to execute computer program instructions stored in memory 228. For example, processor 224 may include any suitable low-power microprocessor suitable for wearable fitness applications.

Processor 224 may communicate with sensors 214-220 (e.g., directly or over a data bus, not shown) to collect data values representing the measured accelerations and rotations in the X-, Y-, and Z-axes. The values may be collected in various ways. For example, in one embodiment, sensors 214-220 may periodically or continuously (e.g., every few milliseconds) measure their respective parameters and output signals indicative of the measured values, and processor 224 may periodically or continuously monitor the values. In another embodiment, processor 224 may periodically poll sensors 214-220 for current values. In another embodiment, processor 224 and/or sensors 214-220 may default to a "sleep" mode. When first acceleration sensor 214 measures acceleration/deceleration above a certain threshold representing a movement of a boxer 102's arm, it may transmit a signal to processor 224. This may "wake" processor 224 and cause it to poll sensors 214-220 for current values. Alternatively, first acceleration sensor 214's signal may "wake" all other sensors, and all sensors 214-220 may transmit current values to processor 224.

Upon obtaining a set of current values from sensors 214-220, processor 224 may determine the rotation of boxer 102's arm in the X-, Y-, and Z-axes of the "real world" coordinate system, as discussed above. Processor 224 may also determine a time of the sample, for example, based on an internal clock. Processor 224 may buffer the values of the magnitude of the measured accelerations in memory 228 before transmitting the buffered samples to boxing data server 106 via radio 222. For example, to conserve power, processor 224 may transmit the buffered samples to boxing data server 106 periodically, when the signal strength or quality of the radio connection to boxing data server 106 is above a threshold, after a certain amount of samples have been buffered, when a charge level of power source 226 is above a threshold, between rounds, when polled by boxing data server 106, or based on other criteria. In other embodiments, however, processor 224 may simply stream the samples to boxing data server 106 in real-time as they become available and use buffering to recover samples lost in transmission.

Although not shown, boxers 102 may also wear a "tail" sensor, which may contain similar components to those discussed above for punch sensor 204 (e.g., processor, memory, sensors, and radio). The tail sensor may be worn on the backside of boxer 102, such as in the shorts, under a waistband or belt, under the back of a shirt, or taped to the boxer's back. Using gyroscope sensor(s) or accelerometer(s), the tail sensor may measure the amount of rotational acceleration in the boxer 102's trunk or hips, which may be used to further refine the determination of the punch gesture (i.e., the type of punch) and the calculation of its force. And because it is fixed to the boxer 102's body, the tail sensor may also measure gross foot movement, cadence, distance traveled, and/or balance of boxer 102. These parameters may be used to determine aggression, dominance, and/or control exercised by a boxer 102 (known as "ringsmanship"), which are factors in scoring a bout that goes to a decision. The tail sensor may communicate with punch sensor 104 via radio to provide its samples of these values, which punch sensor 104 may synchronize and combine with its samples for communication to boxing data server 106. Alternatively, the tail sensor may communicate with boxing data server 106 directly, and boxing data server 106 may synchronize and combine the samples from the different sensors.

Boxer 102 may wear other types of "health" sensors, such as a heart rate sensor, a pulse rate sensor, a pulse oximetery sensor, a hydration sensor, a breathing rate sensor, and/or a bioimpedance sensor. These sensors may be standalone sensors that communicate their sensed values representing boxer 102's health parameters directly to boxing data server 106. Alternatively, these sensors may be incorporated or communicate with punch sensor 104 or the tail sensor, which may incorporate values received from these sensors into their own transmissions to boxing data server 106. For example, since boxer 102's forearm or wrist may be a suitable location for the pulse rate sensor, pulse oximetry sensor, hydration sensor, and/or bioimpedance sensor, one or more of them may be incorporated with the punch sensor 104. Alternatively, boxer 102 may wear one or more of these separate sensors on the wrist or forearm.

FIG. 10 shows an embodiment of a sensing system 1000. Sensing system 1000 may comprise sensing equipment located on the boxer to assess the boxer's motion. In one embodiment, accelerometers may be placed in three locations for each boxer: right glove (or wrist), left glove (or wrist), and the waist (e.g., a "tail" sensor), as shown in FIGS. 2 and 12. The sensing equipment may contain accelerometers, gyroscopic sensors, and/or magnetometers. It may also contain one or more hardware microprocessors, memories, or radios (e.g., Bluetooth and/or WiFi) to transmit the assessed motion to a boxing data server, and/or other components, such as the health sensors described above.

The accelerometers discussed in this document are electromechanical devices to measure acceleration forces. Acceleration forces may be static, like the continuous pull of gravity, or dynamic, in which movement or vibrations are sensed. Acceleration is the measurement of the instantaneous change in velocity. For example, a car accelerating from standstill to 60 mph in six seconds has an average acceleration of 10 mph per second. Gyroscopic sensors, also known as angular rate sensors or angular velocity sensors, are devices that sense angular velocity. Angular velocity is the change in rotational angle per unit of time. Angular velocity is generally expressed in deg/s (degrees per second). A magnetometer may measure the three components of the local magnetic field. When used in conjunction with 3-axis accelerometers, orientation-independent compass heading information can be determined.

In one embodiment, the sensing equipment may contain two triple-axis (i.e., X-, Y-, and Z-axes) accelerometers, a triple-axis (i.e., X-, Y-, and Z-axes) gyroscopic sensor, and a triple-axis (i.e., X-, Y-, and Z-axes) magnetometer. The two accelerometer sensors may be used to create a high resolution accelerometer signal over the entire dynamic range by combining or fusing the accelerometer data. One accelerometer may be operated over a low range, for example between ±20 G, while the high range accelerometer may be set to record values between ±200 G. In practice, the low range accelerometer may be utilized for values less than its maximum measurable value. When the maximum value of the low range accelerometer is saturated or exceeded, the higher range accelerometer data may be utilized.

In one embodiment, sensor data may be obtained from the right glove, the left glove, and from sensing equipment attached to the waist of the boxer. The sampling frequency of the data obtained may be 1 kHz, although a variety of sampling frequencies, both faster and slower, may be utilized. The resulting sensor information may be transmitted via radio to sensing system 1000 (e.g., a boxing data server), as depicted in FIG. 10, and then processed by the boxing data processing system system 1000, as shown in FIG. 11. Sensing system 200 may comprise any type or combination of computing components known in the art for communicating, processing, and storing data (e.g., processors, memories, data storage devices, network interfaces, radios, user input/output devices), as discussed elsewhere in this document.

Figure 3:
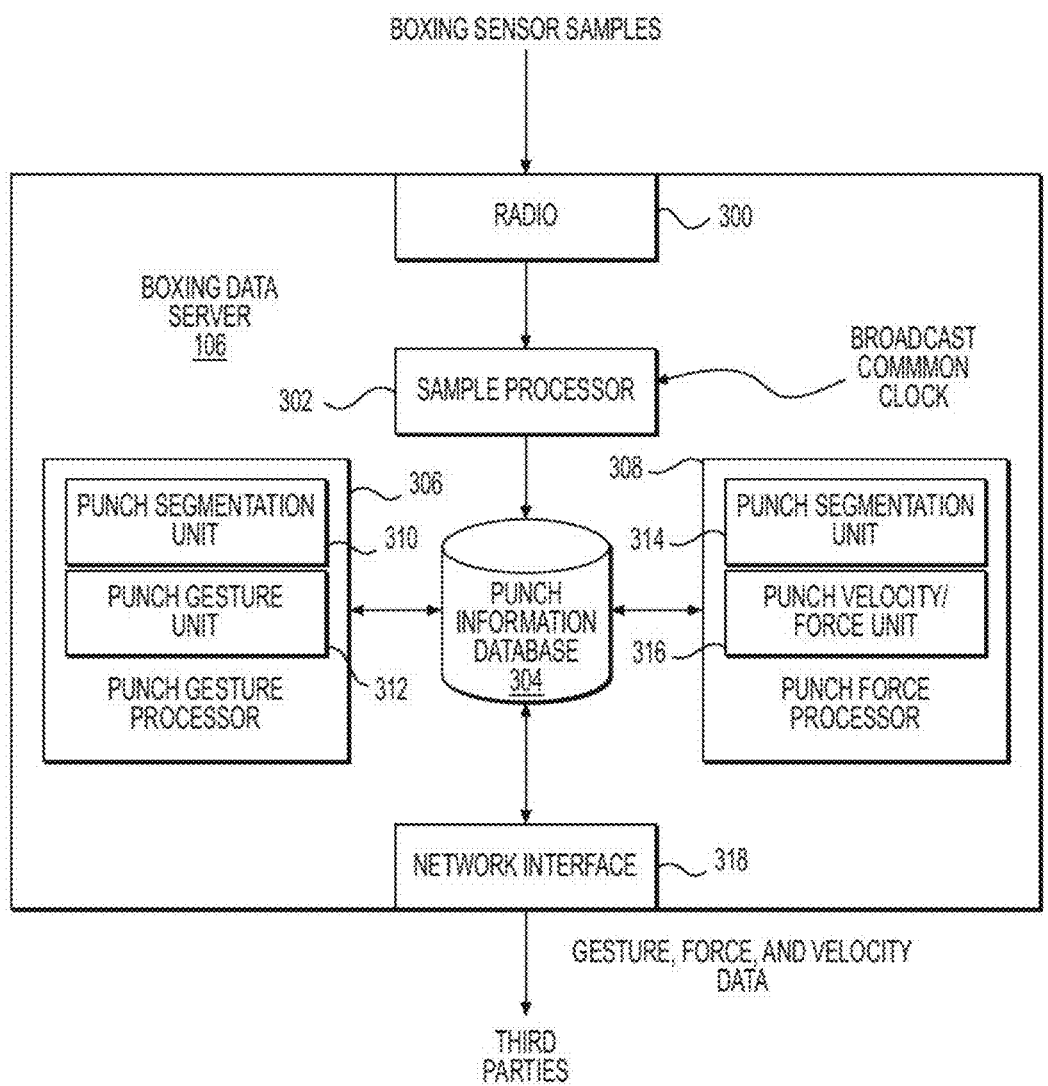
FIG. 3 illustrates an exemplary representation of a boxing data server consistent with one or more disclosed embodiments.

FIG. 3 is an exemplary representation of further details of boxing data server 106. In one embodiment, boxing data server 106 may be in radio communication range of punch sensors 204 worn by boxers 102, such as at ringside, in an office at the arena where the match is held, or at a training facility. Alternatively, boxing data server 106 may be remote from the location of boxers 102, and additional communications equipment (not shown) may facilitate communication between punch sensors 204 and boxing data server 106 over network 110. Boxing data server 106 may include any number and combination of computing components known in the art for communicating, storing, and processing data. For example, boxing data server 106 may include one or more processors, memories, data storage devices, network interfaces, radios, user input/output devices, etc. Although boxing data server 106 is shown as a single server, its functions may be individually or collectively performed by a number of servers, for example, in a cloud computing or server farm arrangement.

As shown in FIG. 3, boxing data server 106 may include a radio 300, which may be similar to, and configured to communicate with, radio 222 of punch sensor 204. Radio 300 may receive the sensor samples from punch sensor 204, where a sample processor 302 may process the samples for storage in a punch information database 304. For example, sample processor 302 may synchronize the samples with a common broadcast clock of a video broadcast of a live boxing match, sparring session, or training session, so that third parties 108 may synchronize display of punch statistics and related graphics and effects with the video broadcast. Sample processor 302 may assemble the sensor samples into open-source format data objects, such as a JavaScript Object Notation (JSON) objects or Binary-Encoded Serialization (BSON) data objects. In one embodiment, punch information database 304 may be an open-source format database, such as a MongoDB.

Boxing data server 106 may include a punch gesture processor 306 and a punch force processor 308. Punch gesture processor 306 may include a punch segmentation unit 310 and a punch gesture unit 312.

Punch segmentation unit 310 may query punch information database 304 to retrieve new formatted sensor samples and identify samples that correspond to a punch event (i.e., an intentional punch impact). In one embodiment, punch segmentation unit 310 may do so by identifying samples in which the acceleration/deceleration value for the first acceleration sensor 214 is saturated (e.g., +/−16G), indicating a punch that has impacted. In an embodiment where first acceleration sensor 216 is omitted, punch segmentation unit 310 may identify samples in which the acceleration/deceleration value associated with second acceleration sensor 216 exceeds a known threshold that differentiates between an intentional punch impact and impacts due to "ranging" or "probing" (e.g., +/−16G). Once punch segmentation unit 310 identifies the sensor sample(s) corresponding to the punch impact, it may retrieve a set of sensor samples from a predetermined amount of time before the impact (e.g., a few milliseconds) to the moment of impact and provide them to punch gesture unit 312 for punch gesture analysis.

Punch gesture unit 312 may determine the gesture of the punch indicated by the set of sensor samples received from punch segmentation unit 310. For example, punch gesture unit 312 may identify linear punch gestures such as the jab (with the lead hand) and the cross (with the trailing hand), as well as rotational punch gestures such as the hook, overhand, and uppercut. Additionally, punch gesture unit 312 may identify punch gestures corresponding to blocked punches. Punch gesture unit 312 may also identify the hand with which the punch was thrown.

Figure 4:
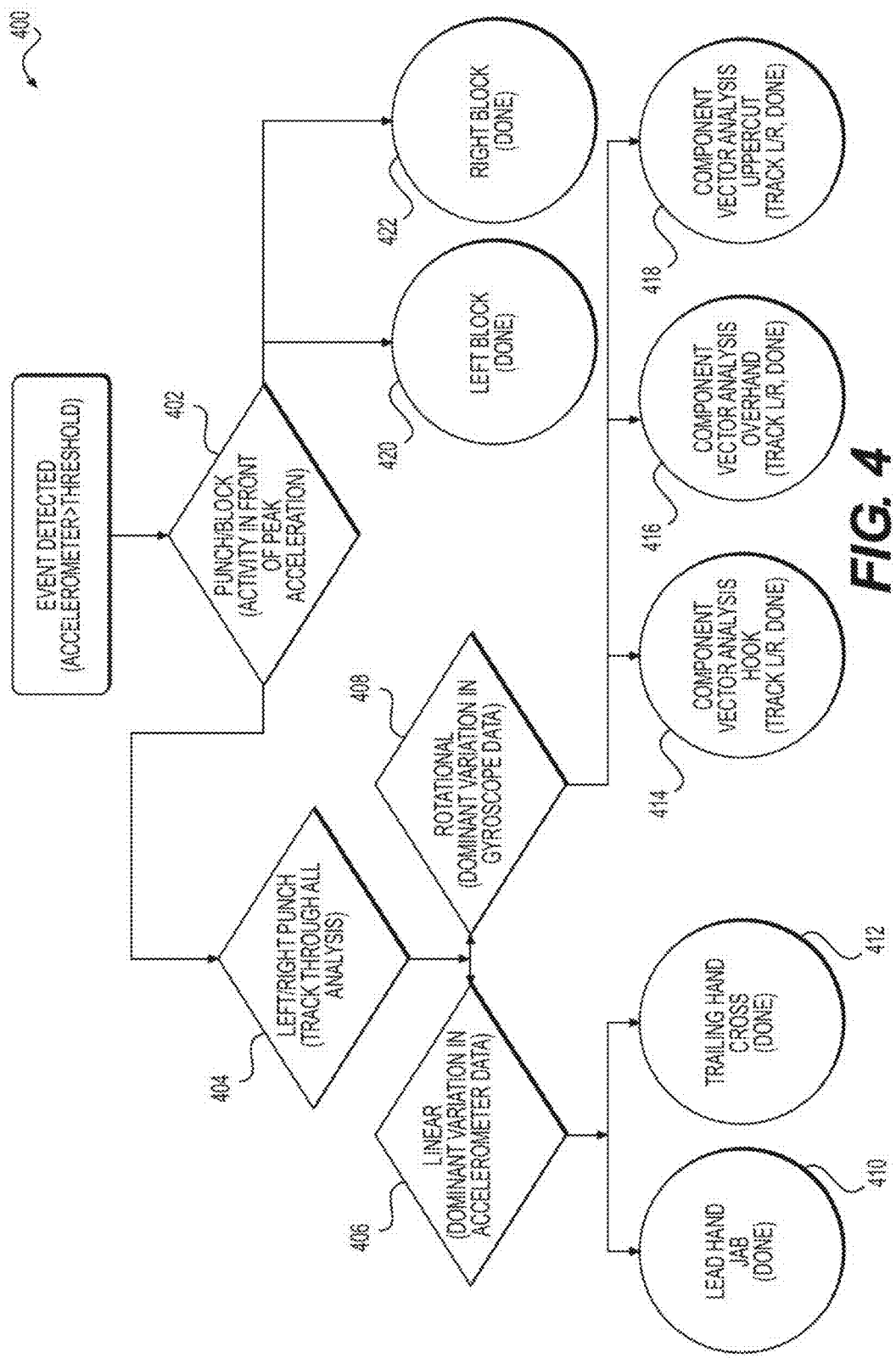
FIG. 4 illustrates an exemplary method of a punch gesture processor, consistent with one or more disclosed embodiments.

FIG. 4 is a flowchart illustrating an exemplary punch gesture recognition algorithm 400 performed by a processor executing computer program instructions for carrying out the tasks of punch gesture unit 312. Punch gesture unit 312 may determine whether the set of samples indicates that the impact was due to the boxer throwing and landing a punch or receiving an impact from an external force (as when blocking an opponent's punch) (step 402). As shown in the Figures, an impact from a blocked punch does not show an appreciable variation in acceleration/deceleration prior to the detected impact. Thus, for a block, the curve for acceleration/deceleration before impact is relatively "flat." By contrast, a landed punch (whether a cross or uppercut) shows appreciable variation in acceleration/deceleration before impact, including a local acceleration/deceleration peak (i.e., not flat).

Figure 5:
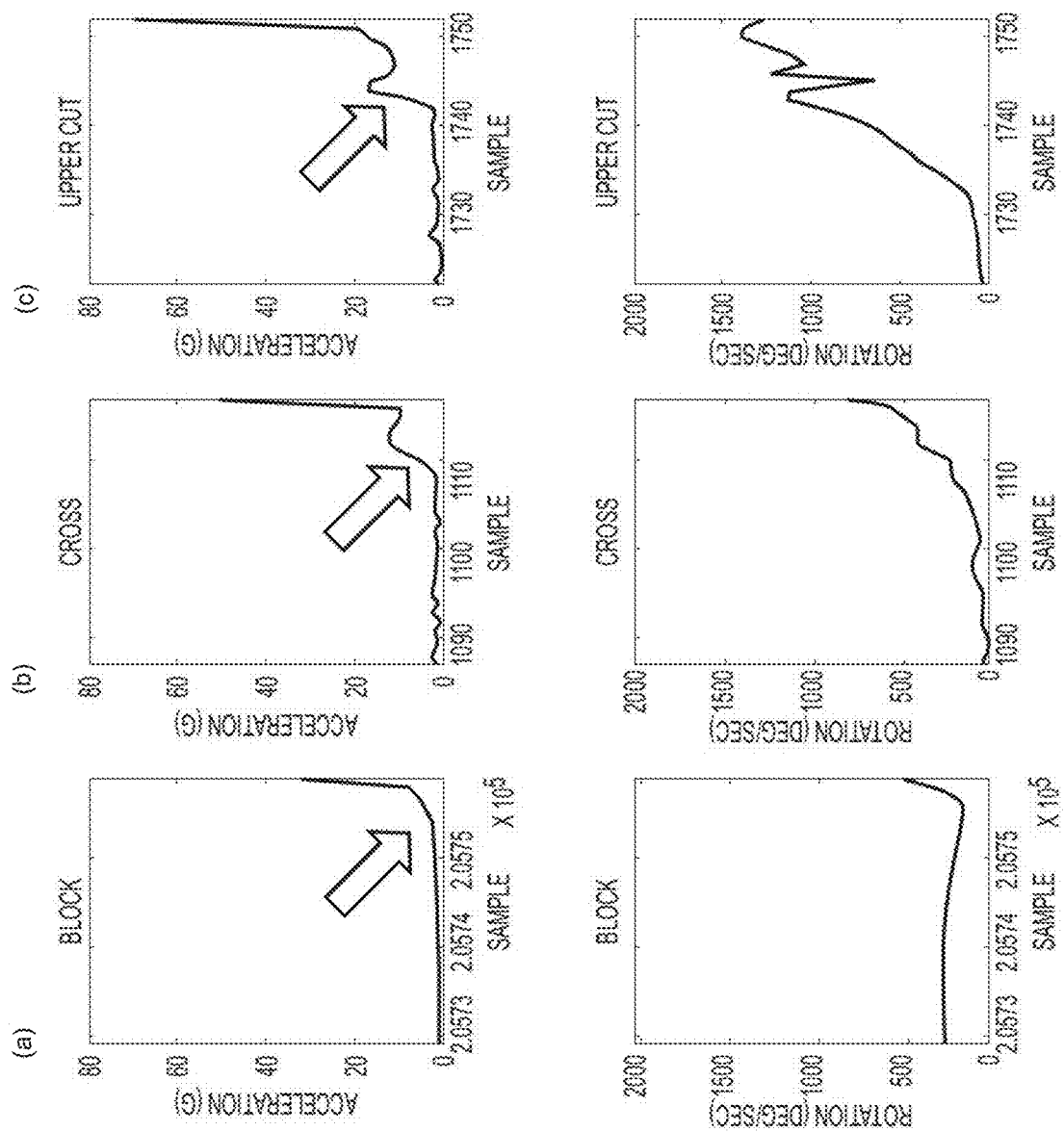
FIGS. 5-8 are exemplary plots of rotational and/or acceleration characteristics of different types of punches.

Similarly, as shown in FIGS. 5(*a*)-(*c*), a blocked punch shows a small variation in the rotational speed of the boxer's forearm prior to impact, whereas a landed punch (whether a cross or an uppercut) shows a large change in the rotational speed of the boxer's forearm prior to impact. Thus, as in the case of acceleration/deceleration, a blocked punch may be characterized by a lack of variation of rotational speed prior to impact (i.e., a flat curve), whereas a landed punch may be characterized by a variation in rotation speed prior to impact (i.e., not a flat curve).

Accordingly, in one embodiment, as part of step 402, punch gesture unit 312 may determine whether the set of sensor samples received from punch segmentation unit 310 indicates a variation in either acceleration/deceleration or rotational speed prior to the moment of impact. Punch gesture unit 312 may use either or both types of variations as factors in determining whether the impact was due to throwing a punch or receiving an impact from an external force. For example, the variation in acceleration/deceleration may be given one weight and the variation in rotational speed may be given another weight, and the weighted variations may be totaled. If it is determined that the variation in either or both is above a threshold, or that the total weighted variation is above a threshold, punch gesture unit 312 may determine that a punch landed. Otherwise, punch gesture unit 312 may determine that the impact was due to a block or other external impact on the boxer.

As an example of determining variation in acceleration/deceleration, punch gesture unit 312 may determine whether the set of sensor samples contains a local peak acceleration value prior to the moment of impact at maximum acceleration/deceleration. As another example, punch gesture unit 312 may determine whether the standard deviation of the acceleration/deceleration values before impact is above a threshold. If any combination of these conditions—which may also be weighted and/or combined—is met, punch gesture unit 312 may conclude that the acceleration/deceleration is the result of a punch. If not, the punch gesture unit 312 may determine that the acceleration/deceleration is the result of the boxer's glove receiving an impact from an external force, as when blocking an opponent's punch.

Similarly, as an example of determining variation in rotational speed, punch gesture unit 312 may determine whether the standard deviation of the rotational speed of the boxer 102's arm before impact is above a threshold. As another example, punch gesture unit 312 may determine whether the average rotational speed of the boxer 102's arm before impact is above a threshold. As yet another example, punch gesture unit 312 may determine whether the derivative or average slope of the rotational speed of the boxer's arm before impact is above a threshold. If any combination of these conditions—which may optionally be given different weights and combined—is met, punch gesture unit 312 may determine that the punch landed. If not, the punch gesture unit 312 may determine that the punch was blocked. If punch gesture unit 312 determines that the set of sensor samples indicates that a punch landed in step 402, punch gesture unit 312 may determine whether the punch was thrown with the left or right hand (step 404). Punch gesture unit 312 may use, for example, known identification information received from punch sensor 204 to identify the hand. The thresholds may be set based on a prior calibration process (discussed below) in which the punches of the particular boxer 102, or a group of boxers, are analyzed.

Figure 6:
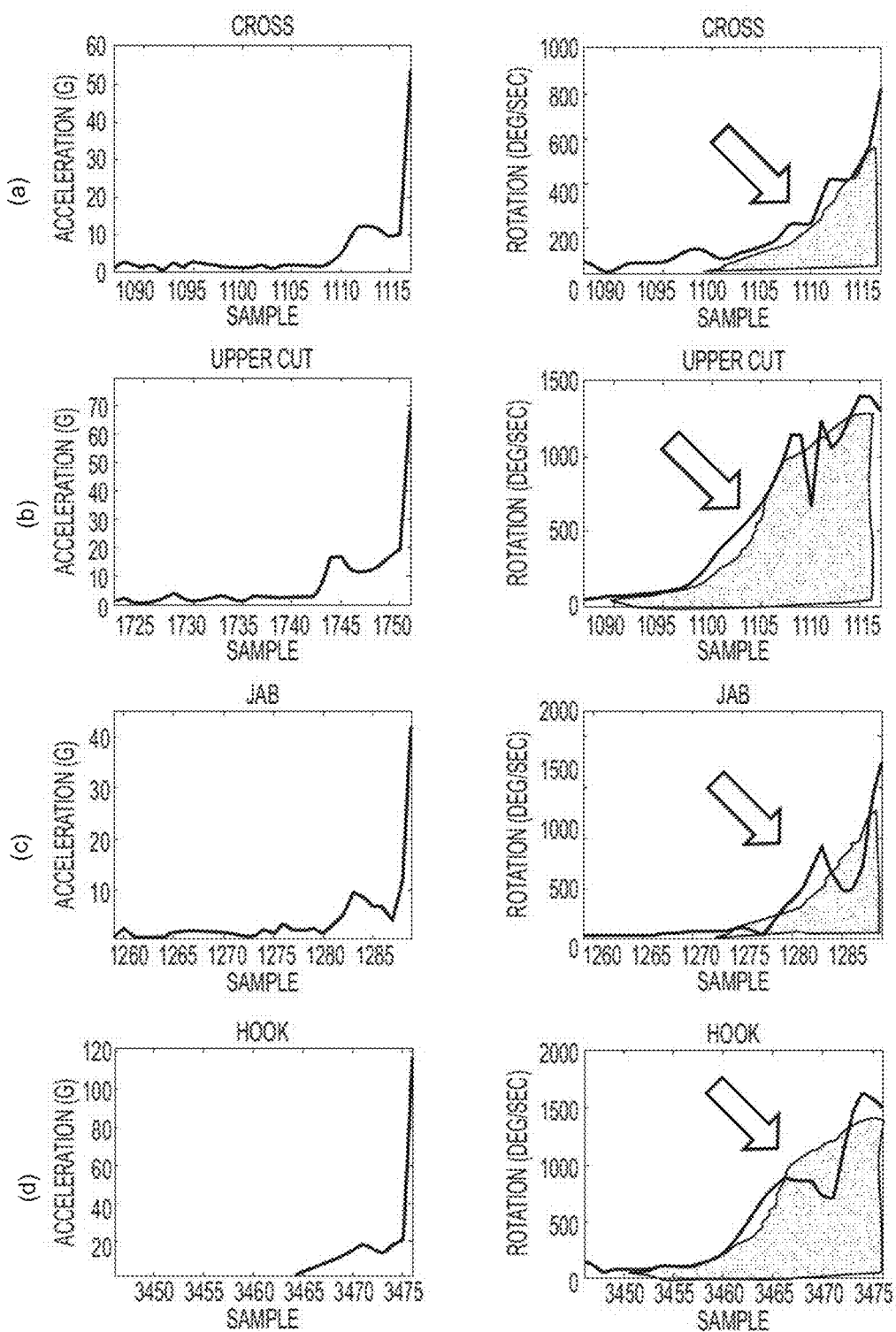

Punch gesture unit 312 may then determine whether the set of sensor samples indicates that the landed punch is a linear punch, such as a jab or cross (step 406), or a rotational punch, such as a hook or uppercut (step 408). As shown in FIGS. 6(*a*)-(*d*), a rotational punch exhibits a greater rotational speed leading up to the moment of impact than a linear punch. Accordingly, in one embodiment, punch gesture unit 312 may integrate or add the rotational speeds indicated by the set of sensor samples. If the integral or total is greater than a threshold, punch gesture unit 312 may determine that set of samples indicates a rotational punch and not a linear punch. If the integral or total is less than the threshold, punch gesture unit 312 may determine that the set of samples indicates a linear punch and not a rotational punch. The threshold may be set based on a prior calibration process (discussed below) in which the punches of the particular boxer 102, or a group of boxers, are analyzed.

Other approaches may be used to determine a linear vs. a rotational punch. For example, punch gesture unit 312 may perform statistical analysis of the various components of acceleration/deceleration values from the acceleration sensor(s) 214, 216 and/or rotational values from the gyroscope sensor 218. Variance (or standard deviation) of acceleration/deceleration vs. rotation prior to impact may be used to classify a punch as linear vs. rotational. Inter-comparison of component data values/statistics may also be used to determine specific punch types (i.e. uppercut vs. hook) where typical behaviors are defined by detailed analysis of punch data from numerous fighters to identify common features.

In another embodiment, punch gesture unit 312 may attempt to fit the rotation values in the set of samples to a known polynomial function (e.g., a second-order polynomial). If the values can be fit, then punch gesture unit 312 may conclude that the punch is a rotational punch, and if they cannot be fit, then punch gesture unit 312 may conclude that the punch is a linear punch. Similar to the threshold, the polynomial function may be determined from a prior calibration process in which the punches of the boxer or a group of boxers are analyzed.

If punch gesture unit 312 determines in step 406 that the punch is a linear punch, punch gesture unit 312 may further determine whether the punch is a jab (step 410) or a cross (step 412). In one embodiment, punch gesture unit 312 may determine whether the hand with which the punch was thrown (as determined in step 404) is the boxer 102's dominant hand for the boxer 102's style. For example, if it was determined that the punch was thrown with the left hand, and information stored in punch information database 304 indicates that the boxer 102 has a conventional style (i.e., right-handed), then punch gesture unit 312 may determine that the punch is a jab. Likewise, if it was determined that the punch was thrown with the right hand, and the boxer has a conventional style, punch gesture unit 312 may determine that the punch is a cross. On the other hand, if it was determined that the punch was thrown with the left hand, and the boxer is a southpaw (i.e., left-handed), punch gesture unit 312 may determine that the punch is a cross. And if it was determined that the punch was thrown with the right hand, and the boxer is a southpaw, then punch gesture unit 312 may determine that the punch is a jab. Of course, other techniques may be used to specifically identify a jab, such as using statistical analysis of the acceleration or rotation of the punch.

Some boxers only fight in one style (conventional or southpaw). Accordingly, in one embodiment, a boxer 102's style may be stored in punch information database 304 (e.g., in a boxer profile), which may be used to determine the type of linear punch in steps 410, 412. However, some ambidextrous boxers switch styles throughout the course of a match or training session. For these boxers, the hand with which the punch was thrown does not necessarily indicate whether a linear punch is a jab (thrown with the leading hand) or a cross (thrown with the trailing hand). Accordingly, in one embodiment, data received from the tail sensor may be used to determine the boxing style throughout the match or training session. For example, the Z-coordinate value (axis putting up) provided by the gyroscope sensor in the tail sensor worn by the boxer 102 may indicate the current rotation of the boxer 102's hips or trunk relative to the boxer 102's opponent. This Z-value may be communicated to boxing data sever 106 as part of each sample and stored in punch information database 304.

Punch gesture unit 312 may use this Z-value, at least in part, to determine the stance of boxer 102 at the time the punch was thrown. For example, since a jab is thrown with the leading hand, boxer 102's hips do not rotate substantially when throwing a jab. However, since a cross is thrown with the trailing hand, the boxer 102's hips may rotate substantially when throwing a cross. Accordingly, in one embodiment, punch gesture unit 312 may determine whether values in the sample indicate that the Z-value rotates (e.g., by more than a threshold angle) while the punch is being thrown. If not, punch gesture unit 312 may conclude that a jab was thrown. If so, punch gesture unit 312 may conclude that a cross was thrown. The threshold may be set based on a prior calibration process in which the punches of the particular boxer 102, or a group of boxers, are analyzed.

Other techniques and/or variables may be used to determine the stance of boxer 102. For example, since a jab is thrown with the leading hand and a cross is thrown with the trailing hand, a jab may typically travel a shorter distance to impact than a cross. Accordingly, in another embodiment, punch gesture unit 312 may use the acceleration data in the set of samples to determine the distance traveled by the boxer 102's arm before impact. If the traveled distance is greater than a threshold, punch gesture unit 312 may determine that the punch is a cross. If the distance is less than the threshold, punch gesture unit may determine that the punch is a jab. Again, the threshold may be set based on a prior calibration process in which the punches of the particular boxer 102, or a group of boxers, are analyzed. Any combination of these factors may also be used to determine whether the punch is a jab or a cross with desired accuracy. For example, punch gesture unit 312 may use the Z-value indicating the rotation of the boxer's hips or trunk, the distance traveled by the punch, or both (e.g., as a weighted sum), to determine whether the punch is a jab or a cross.

If punch gesture unit 312 determines in step 408 that the punch is a rotational punch, punch gesture unit 312 may further determine whether the set of samples indicates that the punch is a hook (step 414), an overhand (step 416), or an uppercut (step 418).

Figure 7:
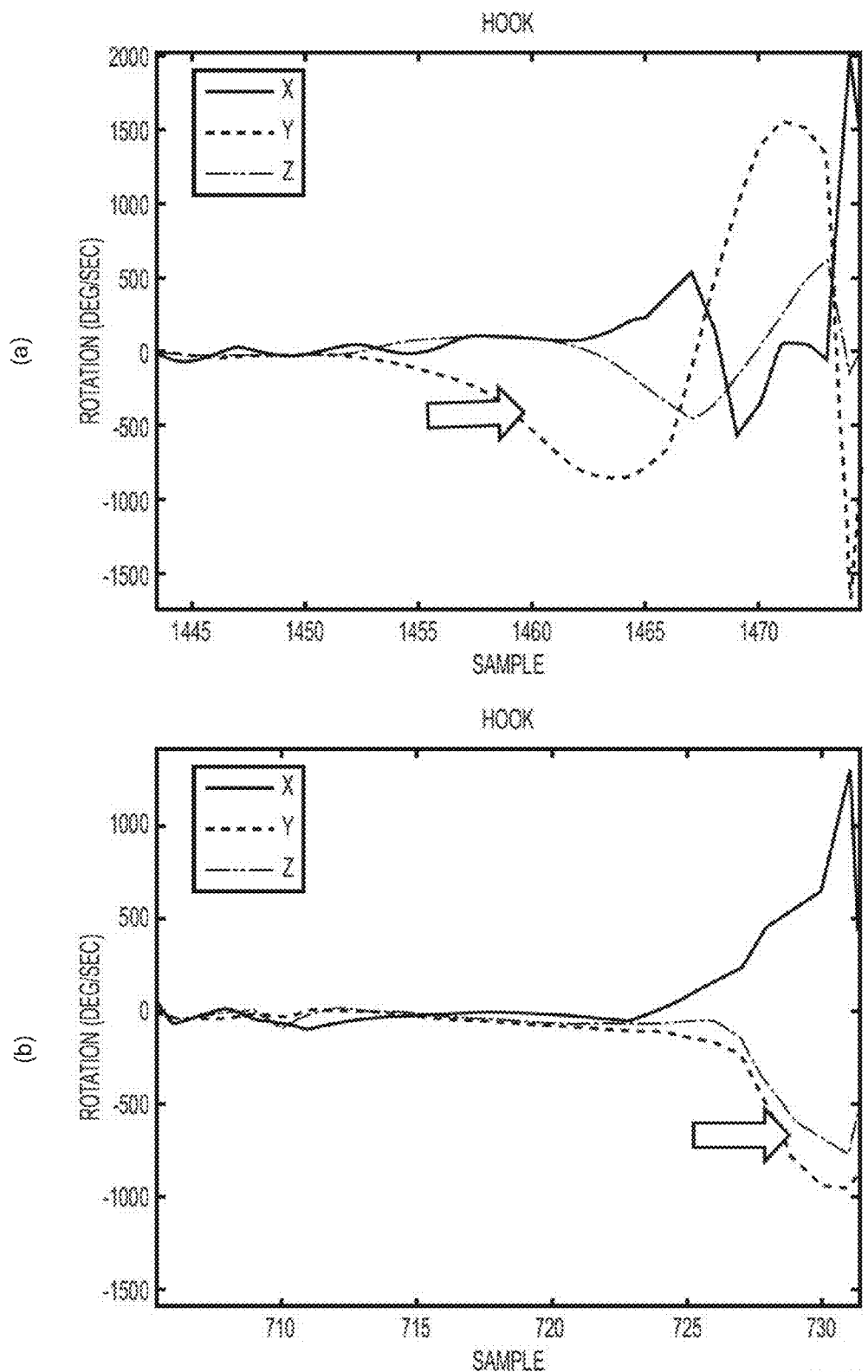

As shown in FIGS. 7(a)-(b), a hook exhibits an inversion or reversal in the rotational direction of each of the X-, Y-, and Z-axes prior to impact, and the inversion is the most pronounced in the Y-axis. By contrast, an uppercut does not exhibit such an inversion. Additionally, just prior to impact, a hook has a positive rotation around the Y- and Z-axes, whereas an uppercut has a negative rotation around the Y- and Z-axes just prior to impact.

Accordingly, in one embodiment, punch gesture unit 312 may determine whether the sensor samples indicate that the boxer 102's forearm changed rotational directions in at least one of the X-, Y-, or Z-axes prior to impact. Alternatively or additionally, punch gesture unit 312 may determine whether the sensor samples indicate that the boxer 102's forearm has a positive rotation around the Y- and Z-axes prior to impact. If either or both of these conditions is met, punch gesture unit 312 may determine that the punch is a hook. Another approach that may be used individually or in combination with this to distinguish a hook from an uppercut is to determine the rates of change of the rotational rates of the boxer's wrist or forearm in each of the X-, Y-, and Z-axes and their ratios to one another. Punch gesture unit 312 may also determine the variance of rotational data within the rotation, as some punches involve a rapid wrist rotation that has a different frequency than the overall punch rotation. For example, uppercuts tend to have a sharp "snap" of the wrist before impact.

Punch gesture unit 312 may also determine whether the sensor samples indicate that the boxer 102's forearm did not change rotational directions in at least one of the X-, Y-, or Z-axes prior to impact. Alternatively or additionally, punch gesture unit 312 may determine whether the sensor samples indicate that the boxer 102's forearm has a negative rotation around the Y- and Z-axes prior to impact. If either or both conditions are met, punch gesture unit 312 may determine that the punch is an uppercut.

If punch gesture unit 312 determines that the sensor samples indicate that the punch is neither a hook nor an uppercut, punch gesture unit may determine that the punch thrown is an overhand. Of course, other techniques may be used to specifically determine whether the punch is an overhand, such as through statistical analysis of the acceleration or rotation of the punch.

If punch gesture unit 312 determines in step 402 that the sensor samples indicate that the punch was blocked, punch gesture unit 312 may determine whether the punch was thrown with the left hand or right hand, as discussed above for step 404. If the punch was thrown with the left hand, punch gesture unit 312 may determine that the punch gesture was a left hand block, and if the punch was thrown with the right hand, punch gesture unit 312 may determine that the punch gesture was a left hand block (steps 420, 422).

Figure 8:
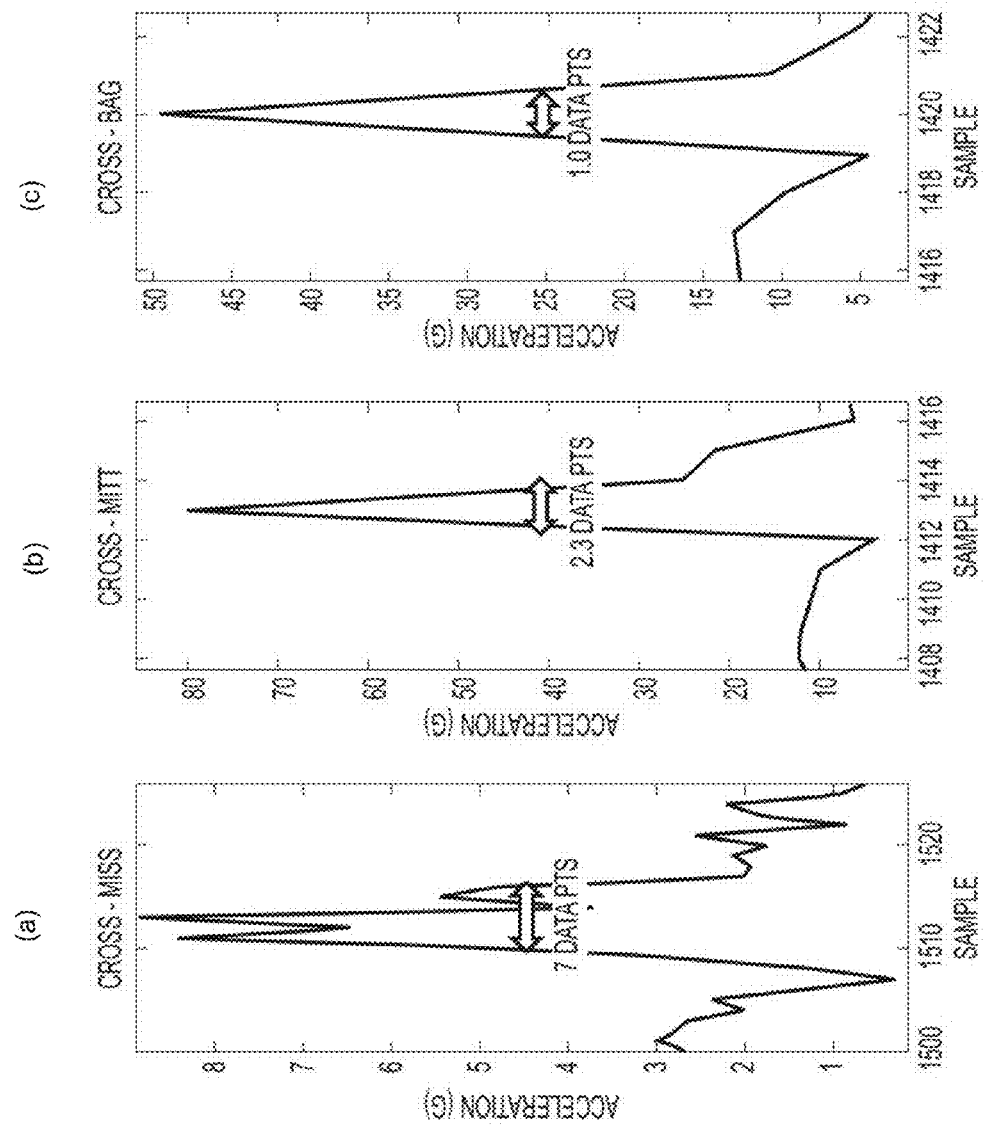

Punch gesture processor 306 may further be configured to determine a landed punch versus a miss or glancing blow. As shown in FIGS. 8(*a*)-(*c*), both a landed punch and a miss have a Gaussian-type distribution of acceleration/deceleration over time. However, a landed punch peaks at a much higher acceleration/deceleration than a miss (e.g., 50-80G for a landed punch vs. 8-10G for a miss), and has a much narrower distribution over time (1-3 data samples for a landed punch versus 7 or more data samples for a miss). Of course, the particular shape of the distributions will depend on the type of equipment used (e.g., gloves), the object struck (e.g., a mitt, a punching bag, an opponent's head, an opponent's body, etc.), the particular boxer's characteristics, and/or other factors. For example, as shown in FIGS. 8(*a*)-(*c*), a cross may exhibit a greater peak acceleration/deceleration and a longer impact time when striking a mitt than when striking a punching bag.

In one embodiment, punch segmentation unit 310 may query punch information database 304 to retrieve new formatted sensor samples and identify samples that correspond to a punch event, as discussed above (e.g., based on a peak acceleration measured by either acceleration sensor 212, 214 and/or saturation of first acceleration sensor 214). Once punch segmentation unit 310 identifies the sensor sample(s) corresponding to the punch impact, it may retrieve a set of sensor samples from a predetermined amount of time before the impact (e.g., 10 milliseconds) to a predetermined amount of time after the impact (e.g., 10 milliseconds) and provide the set of sensor samples to punch gesture unit 312 for punch gesture analysis.

In one embodiment, punch gesture unit 312 may determine if the peak acceleration/deceleration value indicated in the set of samples is greater than a threshold (e.g., 30G). If so, punch gesture unit 312 may determine that the punch landed. And if punch gesture unit 312 determines that the peak acceleration/deceleration is less than that threshold or another threshold (e.g., 15G), punch gesture unit 312 may classify the punch gesture as a miss.

Alternatively or additionally, punch gesture unit 312 may compare the distribution of the acceleration/deceleration indicated by the samples to one or more thresholds. For example, punch gesture unit 312 may determine the amount of time and/or number of samples for which the acceleration/deceleration values are within two standard deviations of the maximum acceleration/deceleration. If the amount of time and/or number of samples is less than a threshold (e.g., 3 samples or 3 ms), punch gesture unit 312 may determine that the punch landed. If the amount of time and/or number of samples is greater than the threshold or another threshold (e.g., 4 samples or 4 ms), punch gesture unit 312 may determine that the punch missed (or glanced).

Accordingly, punch gesture unit 312 may use the peak acceleration/deceleration, the temporal distribution of the acceleration/deceleration, or both to determine whether to classify the punch as a hit or miss. Other techniques may be used to determine a hit or miss. For example, punch gesture unit 312 may determine whether the area under the curve, as determined by adding or integrating the acceleration/deceleration values of the samples for which the acceleration/deceleration values are within a certain number of standard deviations (e.g., 2) of the maximum acceleration/deceleration, is greater than a threshold. If so, then punch gesture unit 312 may classify the punch as a miss. If the area or total is less than that threshold, or another lower threshold, punch gesture unit 312 may classify the punch as a miss. The various thresholds used in the hit/miss determination may be set based on a prior calibration process in which the punches of the particular boxer 102, or a group of boxers, are analyzed.

In another embodiment, punch gesture unit 312 may use conservation of energy principles to determine whether a punch landed or missed. For a punch that misses, the energy (i.e., the integrated data) below the acceleration/deceleration curve before impact should be equal the energy under the curve after impact. This is because all the energy generated by the boxer when accelerating the punch goes into decelerating the boxer's arm and body when the punch misses its target. However, if the punch lands, energy will be transferred into the target, resulting in the energy (i.e., area) under the curve post-impact being smaller than the energy (i.e., area) under the curve pre-impact from the perspective of the punching boxer. Thus, punch gesture processor 312 may sum or integrate the acceleration/deceleration sensor samples pre-impact and post-impact. If the pre-impact sum or integral is substantially equal to the post-impact sum or integral, punch gesture unit 312 may determine that the punch missed. If the sums or integrals are substantially different (e.g., the pre-impact sum or integral is greater than the post-impact sum or integral), then punch gesture unit 312 may determine that the punch landed.

Returning to FIG. 3, punch force processor 308 may include a punch segmentation unit 314 and a punch velocity/force unit 316. Punch segmentation unit 314 may perform similar operations to those discussed above with punch segmentation unit 310 (i.e., extracting sensor samples ahead of a punch impact event).

Punch velocity/force unit 316 may use the punch gesture identified in algorithm 400 along with the sensor samples to determine the force of the punch and its maximum velocity. For example, punch velocity/force unit 316 may estimate or compute the force and velocity based on the acceleration/deceleration data in the set of samples. Velocity may be calculated through the integration of acceleration/deceleration values data using the start time of the punch and the impact time. Impact time may be defined by a discontinuity in the accelerometer data due to a sudden change in acceleration, while the start time may be defined by the acceleration values within a window ahead of the impact. Linear and rotational times use different characteristics to find the estimated start time of the punch gesture. Velocity is checked for consistency by a secondary calculation consisting of integrating the impact-peak (conservation of energy). Contact is determined by the width (temporal) of the impact peak. A simple threshold approach is used, where solid-impact punches typically last on the order of 0.01-0.02 seconds while glancing blows typically have a width closer to 0.05 seconds.

Punch gesture processor 306 and/or punch force processor 308 update the data objects in punch information database 304 with the determined characteristics of the punch, including: (1) the type of punch thrown (i.e., the gesture determined in algorithm 400), (2) the time of the thrown punch, (3) the boxer 102 who threw the punch, (4) the punching hand (right or left), (5) the force of the punch, and (6) the velocity of the punch. In one embodiment, the punch data object (i.e., a "punch packet" or "punch package") may be created based on the segmented sensor information associated with a given punch. For purposes of this disclosure, a punch package or packet refers to a collection of sensor information associated with either a singular punch or multiple punches.

A punch data object may contain one or more of the following data: (1) X-, Y-, and Z-axes accelerometer data (e.g., for both sensors on a glove and/or the waist sensor); X-, Y-, and Z-gyroscopic data (e.g., for both sensors on a glove and/or the waist sensor); and X-, Y-, and Z-magnetometer data (e.g., for both sensors on a glove and/or the waist sensor). Any desired combination of sensor data may be incorporated into a punch data object. The accelerometer data in the data object may represent the combination of two accelerometers on a glove that are configured to enable high-resolution accelerometer data procurement over the accelerometer range of the punch, as discussed above. For example, a low-range accelerometer may be set to record values between ±20 G while a high-range accelerometer may be set to record values between ±200 G. In practice, the low range accelerometer may be used for values less than its maximum value. When the maximum value of the low range accelerometer is saturated or exceeded, the higher range accelerometer data are utilized.

In one embodiment, sensor data may be obtained from the right glove, the left glove, and a sensor attached to the waist of the boxer. The sampling frequency of the data obtained may be 1 kHz, although a variety of sampling frequencies, both higher and lower, may be utilized. The resulting punch data object may then be processed for the determination of the performance metrics. The punch data object may be stored in punch information database 304.

Upon identifying the punch gesture, force, and velocity, and updating punch information database 304, punch gesture processor 308 and/or punch force processor 308 may query punch information database 304 for new sensor samples (i.e., new punches) and analyze them as discussed above.

Segmentation

FIG. 11 illustrates another algorithm 1100 or processing architecture that may be used by sensing system 1000. It may be performed by one or more computer processors of sensing system 200 executing computer program instructions stored in memory designed to carry out the disclosed functions.

The streaming sensor data received from the sensor(s) on the boxer may be stored in a database (e.g., FIG. 11, "sensor data"). An initial step of algorithm 1100 is segmentation of the sensor stream of data, before or after storage in the database (e.g., FIG. 11, "segmentation"). The segmentation process may identify those sensor readings that are consistent with a punch activity so that subsequent processing of these observations can occur for the production of a punch-specific package of information (e.g., a "punch package" or "punch packet"). The segmentation of a punch-related activity may be made by using one or multiple threshold levels on one or more sensor readings, as discussed elsewhere in this document. For example, the X-axis accelerometer (i.e., the accelerometer readings from the motion of the glove away from the body) may be used to assess punch-related activities via a threshold detection level. But because accelerometer values can vary and drift over time, a more refined methodology may be used. One such method is to calculate the second derivative of the acceleration sensor data. These data may then be processed to determine a short-term energy level via an appropriately-sized moving window.

Figure 13:
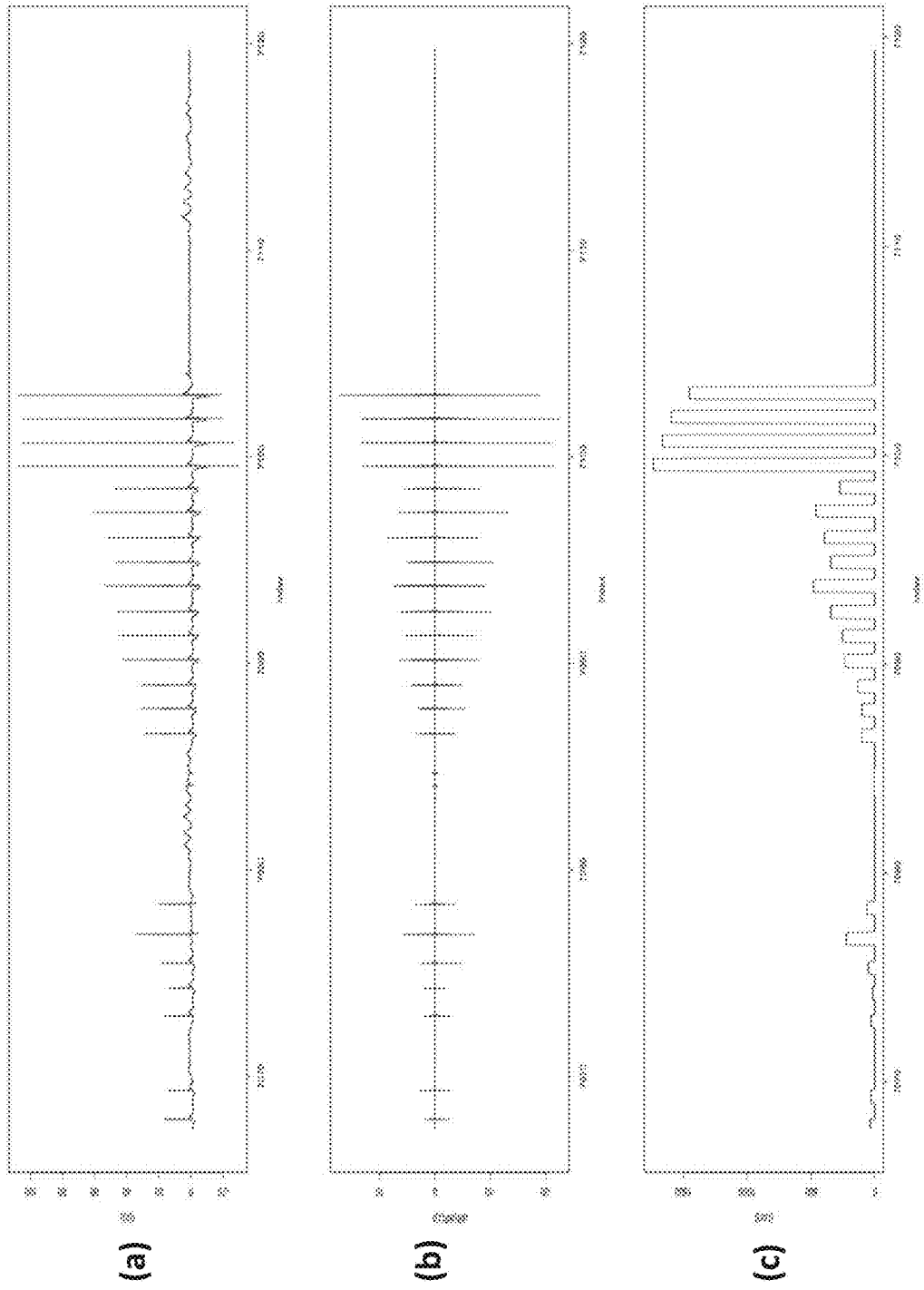
FIGS. 13(a)-(c) show an exemplary representation of punch identification via segmentation, consistent with one or more disclosed embodiments.

In FIGS. 13(a)-(c), the top plot shows a raw data stream from the X-axis accelerometer of a boxer striking a force plate. The middle plot shows the second derivative of the data stream. The third plot shows the output of the short-term energy function. The result is an output function that allows for the easy determination of punch-related activities, as the punch impact event can be easily identified based on the increase in energy level.

Figure 14:
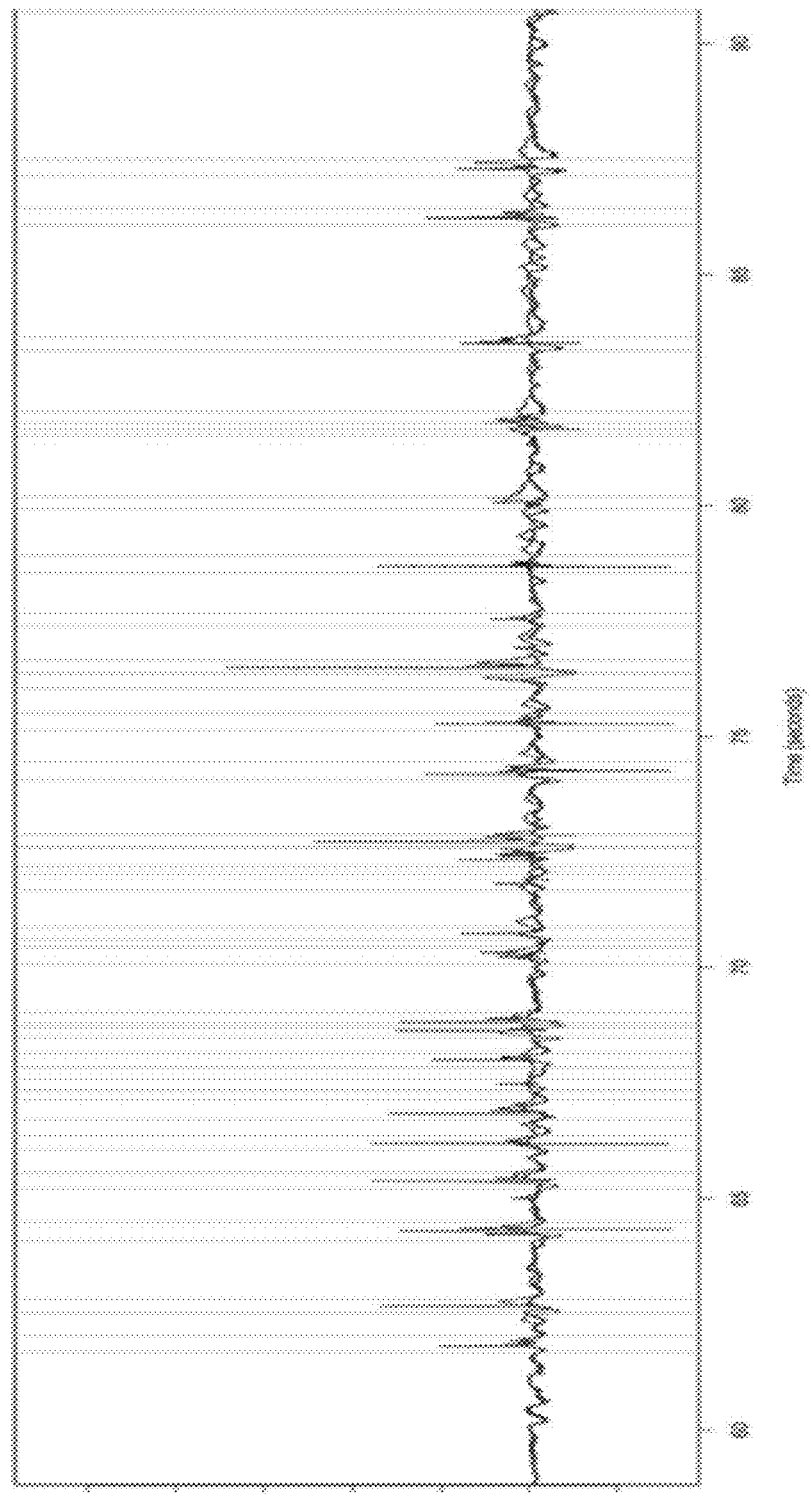
FIG. 14 is an exemplary representation of punch segmentation during a fight, consistent with one or more disclosed embodiments.

The effectiveness of this methodology is demonstrated in FIG. 14, which illustrates data from an actual boxing match. Segmented punches represented by the dark lines are highlighted between the lighter vertical lines defining the segmentation windows. In this case, one can see the very rapid nature of the punches thrown, how the punches are often thrown in clusters, and the varying magnitude and overall chaotic nature of the punches. Careful inspection of the plot in conjunction with video data allows determining that significant punches are appropriately segmented. This particular fight sequence in FIG. 14 involved the boxer only throwing punches while the other boxer was in a defensive position.

Block Versus Punch Determination

The process of blocking a punch can result in sensor readings of significant magnitude. Therefore, the segmentation methods that use a threshold detection or determining an integrated energy metric may falsely identify a blocked punch as a boxer-initiated punch. As the performance metrics may be based upon boxer-initiated punches, a methodology to effectively determine blocks versus punches is desired.

Figure 15:
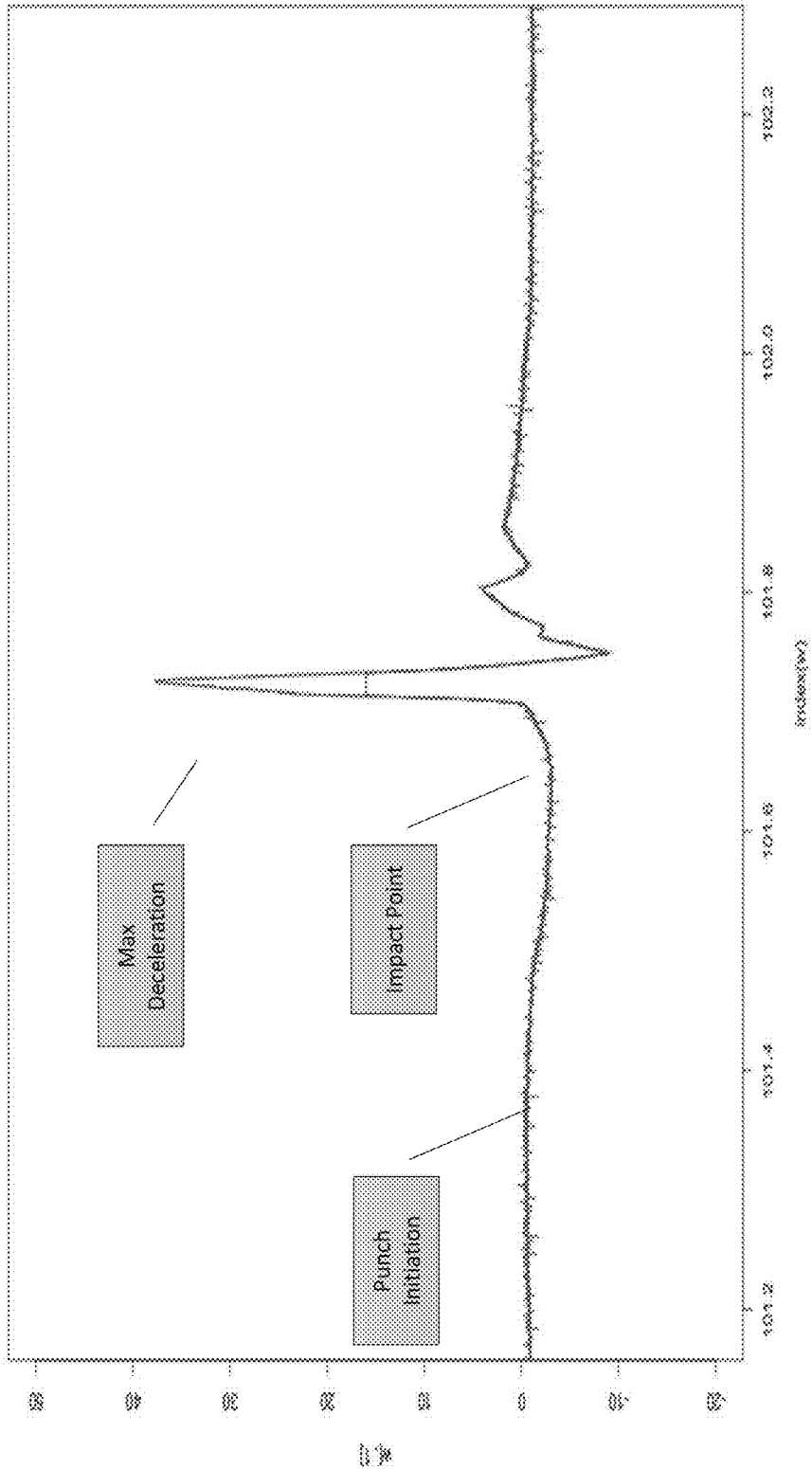
FIG. 15 illustrates exemplary characteristics of a typical punch.
Figure 16:
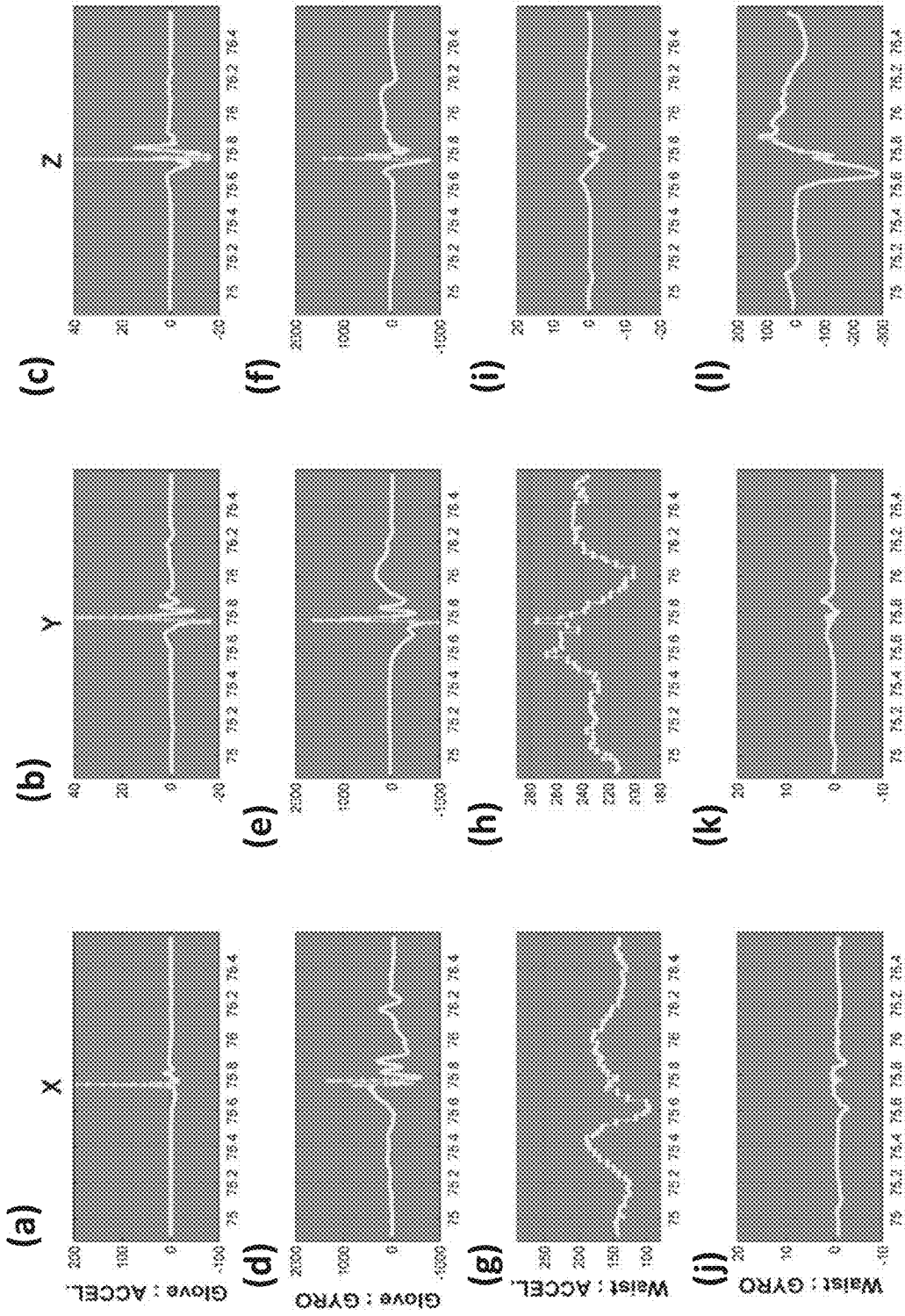
FIGS. 16(a)-(l) illustrate exemplary sensor data obtained from a boxer.
Figure 17:
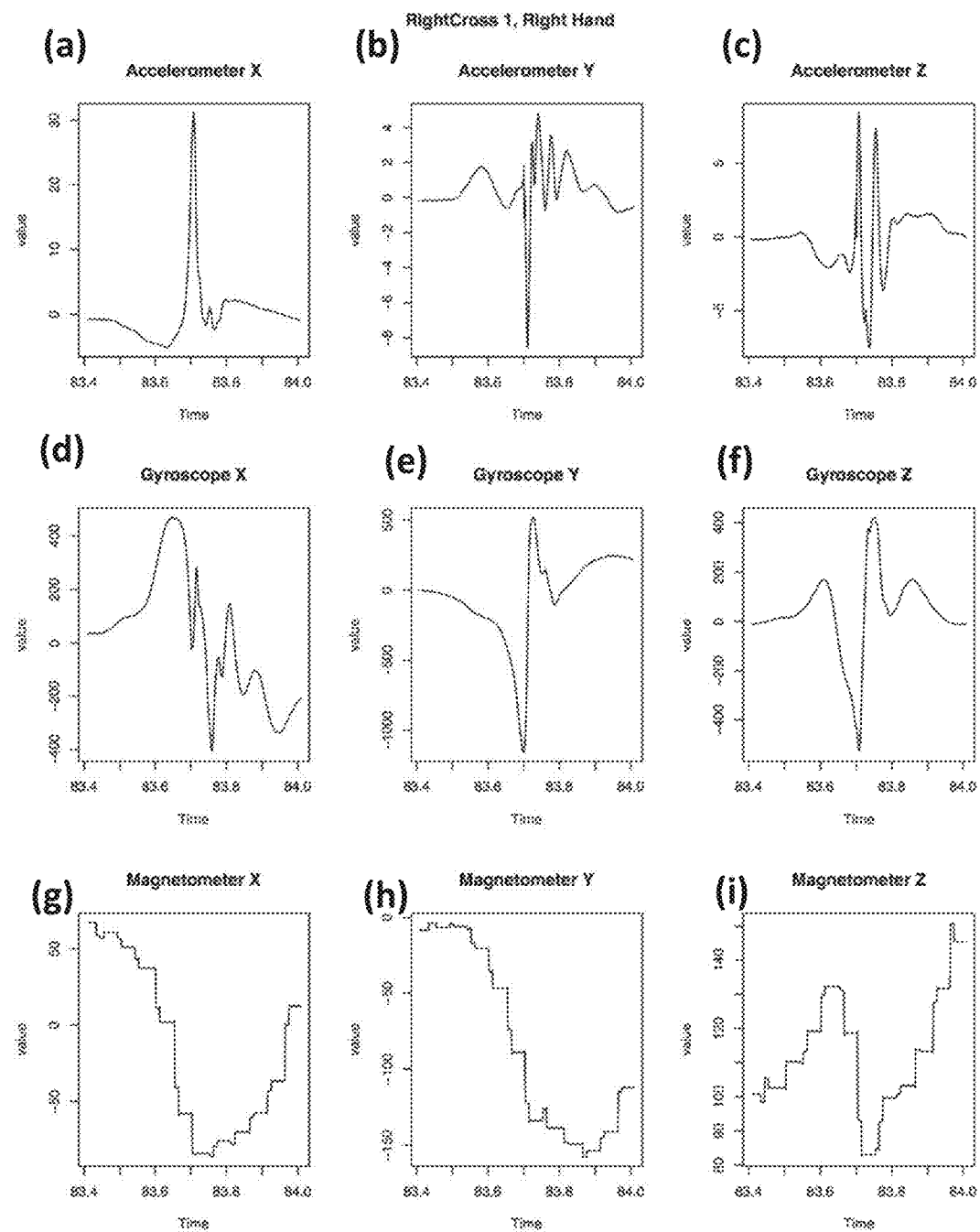
FIGS. 17(a)-(i) illustrate further exemplary sensor data associated with a punch.
Figure 18:
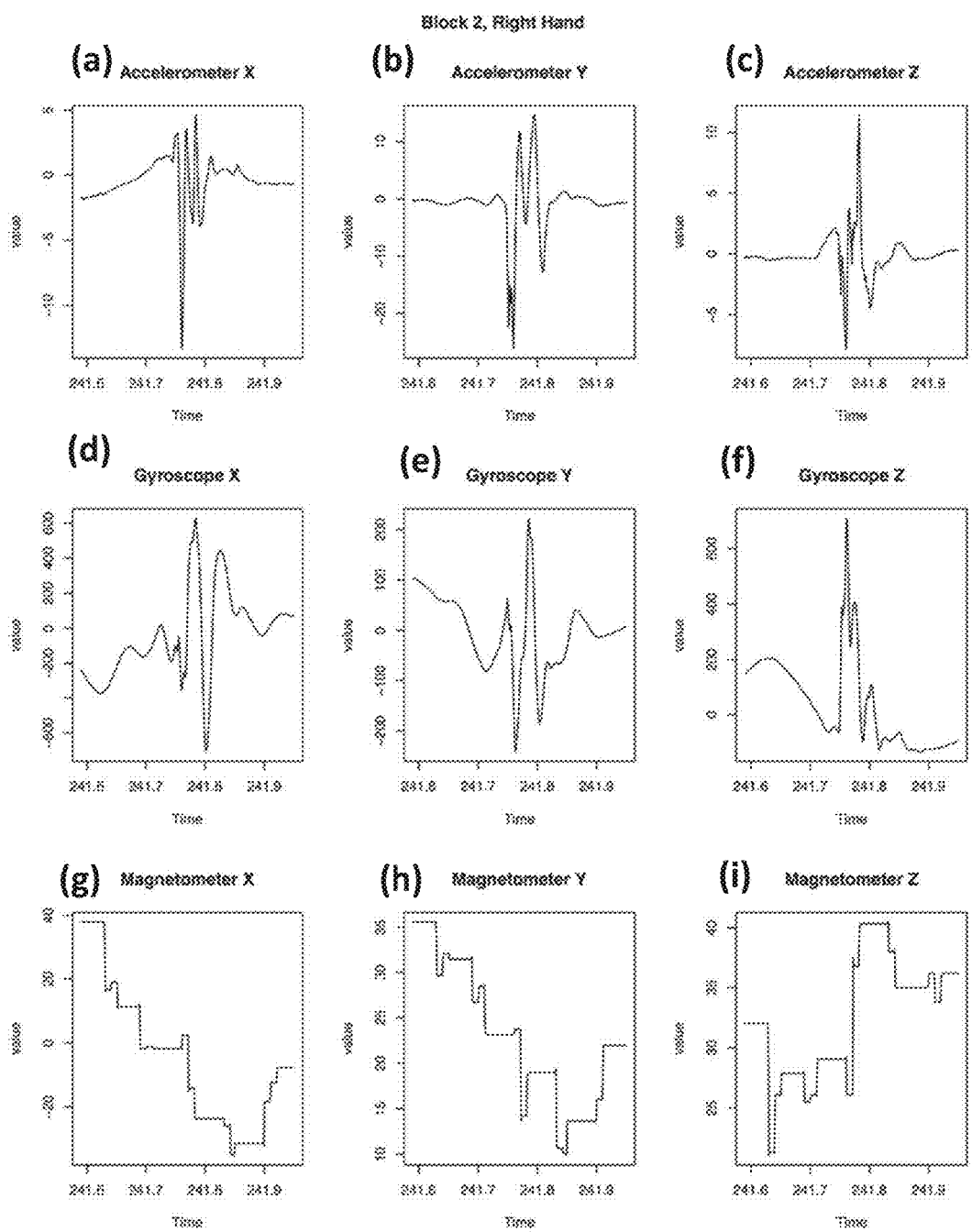
FIGS. 18(a)-(i) illustrate exemplary sensor data associated with blocking.
Figure 19:
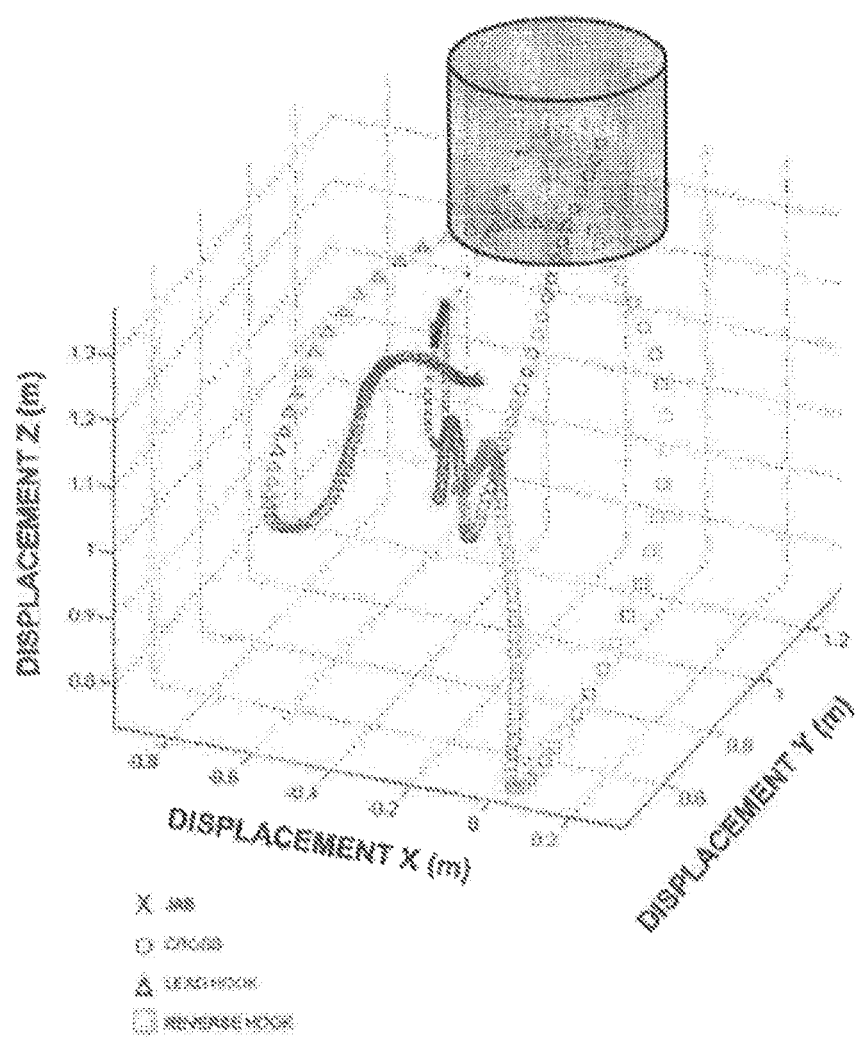
FIG. 19 illustrates exemplary trajectory of different punch types.

In practice, a boxer-initiated punch is an intentional movement via a deterministic motion. The anatomy of a punch includes an initiation phase, an impact point, and a point of maximum deceleration. The initiation phase is typically described by increasing accelerometer values over the period of 0.2 seconds prior to impact. This duration or frequency of acceleration is defined by the limits of human physiology. FIG. 15 shows the X-axis accelerometer values for a right cross, as well as the initiation of the punch, increasing acceleration, followed by decreasing acceleration and the point of impact.

FIGS. 16(a)-(l) shows sensor data obtained from a right glove of a boxer executing a right cross. Specifically, FIGS. 16(a)-(l) shows the measured acceleration and gyroscopic rotation readings for X-, Y-, and Z-axes for both the glove accelerometer and gyroscope and for the waist accelerometer and gyroscope.

The sensor data show a characteristic initiation of physical activity within about 0.2 seconds prior to impact. As can be seen, the waist sensor contains information regarding the boxer's body motion during a punch, including the rotation of the hips measured by the gyroscope and the acceleration of the hips measured by the accelerometer in all three directions. Similar information is shown in FIGS. 17(a)-(i) for a complete set of glove data, including magnetometer data, and the same information for a blocked punch is shown in FIGS. 18(a)-(i). The sensor data for a blocked punch shows a far more chaotic structure, higher frequency components, and evidence of vibration.

The inventors have developed several methodologies for separating blocks from punches. In one embodiment, algorithm 1100 (executed by system 1000) may determine the point of impact by identifying a zero crossing of the X-axis accelerometer values. Algorithm 1100 may then obtain the sensor data preceding the point of impact (e.g., 0.2 seconds preceding), and evaluate that sensor data to determine whether the impact was due to a punch or a block (FIG. 12, "Punch vs. Block"). The evaluation criteria may include the direction of the x-axis acceleration as well as other accelerations, and/or determining a monotonic increase in acceleration followed by a more precipitous decrease prior to impact. Additionally, the gyroscopic data in a punch have moderately smooth characteristics and can also be used for determining punches versus blocks.

Supervised classification techniques may also identify punches versus blocks by using training data containing both types of data. Generally, punches may have similar characteristics due to their deterministic nature. In contrast, blocks are chaotic and represent a nondeterministic and chaotic space, and may therefore have more chaotic or white noise characteristics. Algorithm 1100 may use this type of information to determine punches versus blocks through supervised classification techniques. For the purposes of this disclosure, supervised classification techniques broadly refer to the machine-learning tasks of inferring a functional relationship based upon labeled training data. Supervised learning techniques may include decision trees, K nearest neighbors, linear regression, Bayes techniques, neural networks, logistic regression, support vector machines, relevance vector machines, or other learning techniques known in the art.

In addition to methodologies that utilize the information from one boxer, algorithm 1100 may obtain additional information for the determination of a block versus a punch by looking at the actions of the opposing boxer. For example, if the sensors observe a highly deterministic punch initiated by Boxer A followed by a chaotic sensor reading from Boxer B within a very short time window, then the system may ascertain that Boxer A initiated a punch and Boxer B blocked the punch. One of ordinary skill in the art will recognize that these various methods can be used independently or in combination for the effective determination of a punch of event.

Determination of Punch Type

After segmentation and a determination that a punch was thrown rather than blocked, algorithm 1100 may determine the type of punch thrown (FIG. 11, "punch determination"). The determination of the punch type may be based on gesture recognition. Gesture recognition is the process of categorizing an intentional movement of the hand and/or arms to express a clear action. For determining the type of punch thrown, algorithm 1100 may use stored or referenced predefined categories or types of punches that will be characterized. For example, typical left-handed punches for a right-hand dominant boxer are the left jab, left hook, and left uppercut. The corresponding right-handed punches are a right cross, right hook, and right uppercut. The type of punch thrown is largely defined by the trajectory of the punch.

FIGS. 20(a)-(d) illustrate exemplary 3-D trajectory graphs for four types of punches. The graphs show different trajectories of the acceleration of the boxer's arm for each punch type. (The X-axis represents time in seconds and the Y-axis represents rotation.) For example, the graph for the hook shows the acceleration of the punch starting around zero, decreasing to about −5G, increasing to about 7.5G, and then returning to zero. The graph for the cross shows the punch starting at zero acceleration, decreasing to about −5G, increasing to about 16G, and then oscillating to zero in a noisy fashion. The graph for the uppercut shows acceleration of the punch starting at zero, oscillating between 2 and −2G, increasing to about 10.5G, then returning to zero. The graph for the jab shows some small initial oscillations followed by a peak acceleration to over 0.5G before returning to zero acceleration.

Algorithm 1100 may process the punch data object to determine the type of punch thrown in the presence of extraneous movements by the boxer, fatigue of the boxer, and other variances that influence the quality of the sensor information and create variance in the punch trajectory.

Algorithm 1100 may use the motion or trajectory of the glove to determine the type of the punch. The type of the punch may be independent of the rate of travel or speed of the punch. Therefore, algorithm 1100 may identify the punch regardless of the punch speed. As an initial processing step, algorithm 1100 may process a punch data object in a manner to minimize the influence of punch speed. In one embodiment, algorithm 1100 may accomplish this through dynamic time warping. Dynamic time warping is an algorithm for measuring the similarity between two temporal sequences that may vary in time or speed. By applying dynamic time warping, algorithm 1100 may recognize the same type of punch even if it is thrown at different speeds. Specifically, algorithm 1100 may calculate an optimal match between two given punch sequences by "warping" nonlinearly the time dimension of the punch sequences to determine a measure of similarity independent of the time dimension. Algorithm 1100 may apply a variety of other methods alone or in combination with dynamic time warping to minimize the influence of punch speed differences in identifying the type of punch.

The resulting information can be used for punch recognition. The disclosed system may have two discrete parts or phases: a training phase and a recognition phase. The training phase consists of acquiring several repetitions of each punch type such that it may be recognized later during the recognition phase. These training samples are utilized to create a target or template representation for a given punch type. For example, three punches defined for the left hand would generate a minimum of three punch templates. These templates may represent an integration of the characteristic features of a given punch. The system may use a single template or multiple different templates for a given punch type.

The operation of the system 1000 to create punch templates will be described with reference to FIG. 20. As discussed above, the top graphs in FIG. 20 illustrate acceleration/deceleration profiles over time for four different punches: right hook, right cross, right uppercut, and a right jab. In these examples, the boxer was operating from a southpaw stance. These four punches represent the effective templates for these punches based on the X-axis accelerometer values observed during training. The graph of the bottom punch, referred as a "query punch," is the acceleration sensor data associated with a punch without a known punch type designation.

To determine the type of the query punch, algorithm 1100 may compare the acceleration (or rotation) profile of the query punch to the previously-defined punch templates through one or more distance techniques. In one embodiment, algorithm 1100 may apply a Euclidean distance metric to quantify the differences between the query punch profile and the punch template profiles. Based on the distance metric for each of the comparisons, algorithm 1100 may identify the type of the punch. For example, in one embodiment, algorithm 1100 may select the punch corresponding to the comparison that resulted in the shortest distance metric. Any combination of the X-axis (time) distance, the Y-axis (acceleration or rotation) distance, and/or the scalar magnitude distance may be used for this purpose. Other types of comparison techniques may be used alone or in combination with one or more distance metric techniques.

Figure 20:
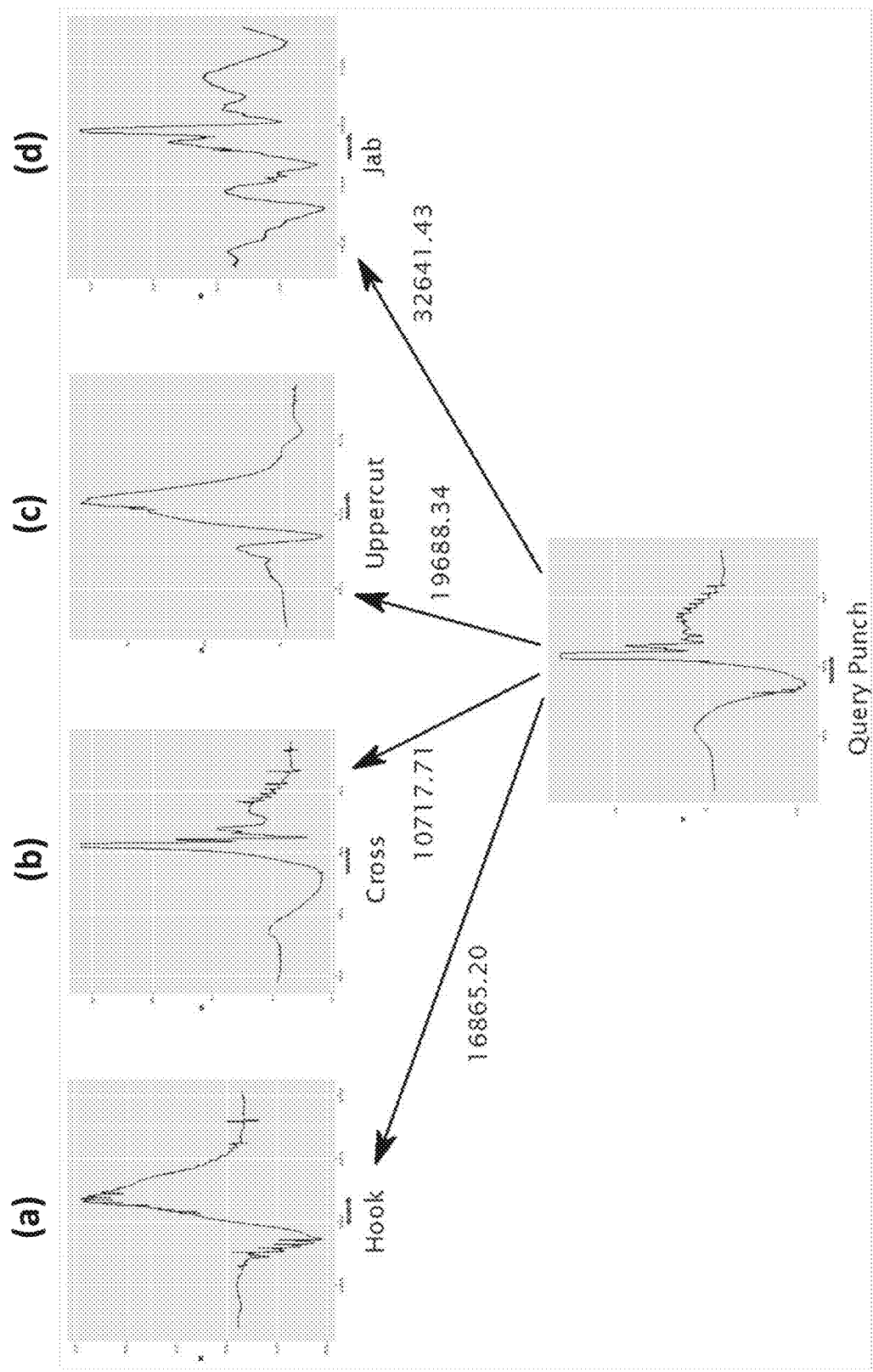
FIGS. 20(a)-(d) illustrates exemplary templates for punch distance calculations.

The numbers below the four punch templates in FIG. 20 are exemplary values resulting from the distance metric calculations. In this example, the smallest distance value (and best match) is the cross, meaning that the query punch exhibits X-axis accelerometer characteristics that most closely correspond to the cross. In this particular case, the query punch was in fact a right cross and it was correctly identified.

Algorithm 1100 may apply this type of sensor comparison to any other accelerometer and/or gyroscope information. For example, to provide the best accuracy, algorithm 1100 may use all available sensor information for the punch-type identification. In one example, this would include data from accelerometers and the gyroscope on the glove, as well as the accelerometer and gyroscope on the waist sensor, for the X-, Y-, and Z-axes. However, depending upon the application (e.g., a consumer application), a smaller subset of sensor values may be used to save cost and/or computing resources.

Figure 21:
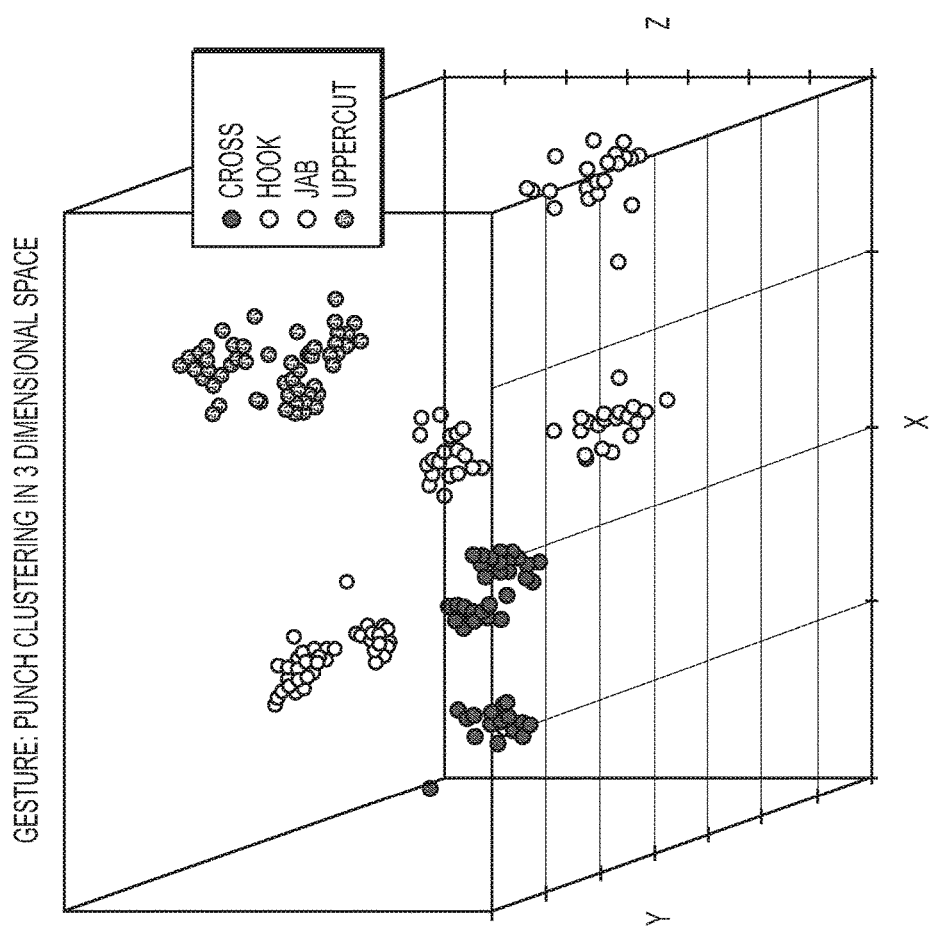
FIG. 21 illustrates exemplary punch clustering in three-dimensional space.

FIG. 21 shows an exemplary degree of separation between punches obtained when utilizing only the X-, Y- and Z-accelerometer data from the right glove. As shown, the four punch types shown in FIG. 20 may exhibit some degree of overlap in one sensor dimension (e.g., the X-axis), but can be clearly separated when multiple sensor dimensions are utilized. The right hooks may occupy slightly different spaces or create three discrete clusters. In this case, this occurred because some of the training data was obtained by hitting a heavy bag, some was obtained by hitting mitts held by a trainer, and some was obtained by simply going through the punch gesture without striking any object. One or more templates can be assigned to a given punch type and target (e.g., mitts, heavy bag, sparring, and/or live match templates).

FIG. 22 shows a confusion matrix illustrating exemplary overall training performance results based upon the described techniques. The confusion matrix shows 100% correct punch recognition overall. In this embodiment, the accelerometer data from both gloves was utilized as well as gyroscopic and accelerometer data from the waist sensor. The resulting sensor data could be processed for punch type determination via a variety of techniques associated broadly with supervised classification. Specific techniques that have applicability include but are not limited to hidden Markov models, finite state machines, conditional random fields, and/or decision trees. Random forest is a particular type of decision tree that has particular applicability to this problem. A random forest is an ensemble learning method for classification, regression, and other tasks, that operates by constructing a multitude of decision trees at training time and would output the type of punch thrown.

Symmetrical Elements of a Punch

Figure 23:
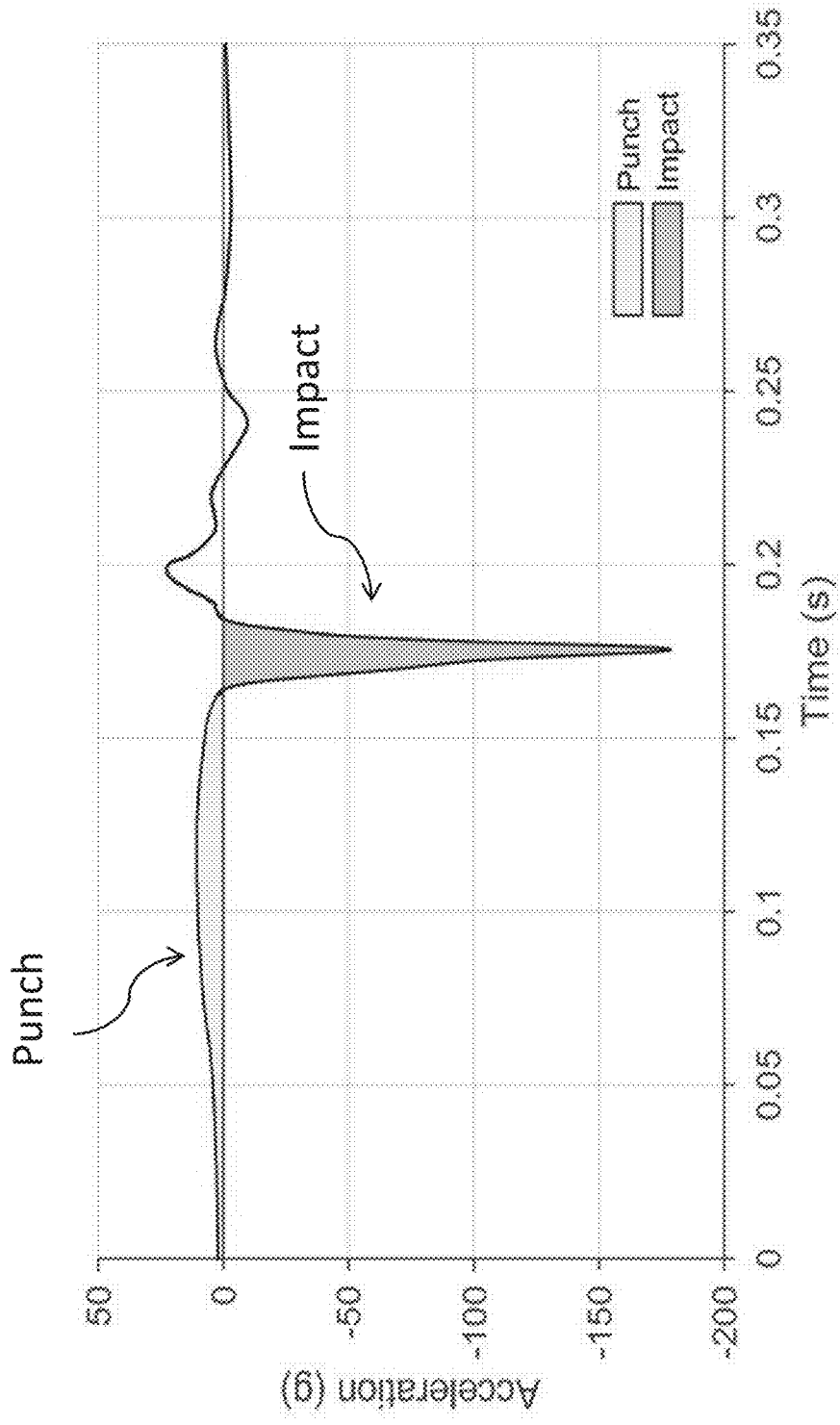
FIG. 23 illustrates an exemplary definition of punch initiation and impact.

For any given punch type, there may be an archetypal profile of acceleration across time. Typically, this shows two types of qualitative behaviors: punch initiation and punch impact, as shown in FIGS. 23 and 24.

The impact window begins when the rate of change of acceleration decreases sharply. The initiation window ends when the impact begins. Characteristics of the window profiles (area, duration, etc.) give useful information for classifying punch type and quantifying velocity and force. The area under the acceleration curve is the change in velocity. During the initiation window, the punch reaches its maximum velocity, and during impact the velocity must return to zero. Thus, there is a symmetrical relationship about the impact point from an area under the accelerometer curve perspective.

Force and Velocity Determination

Figure 24:
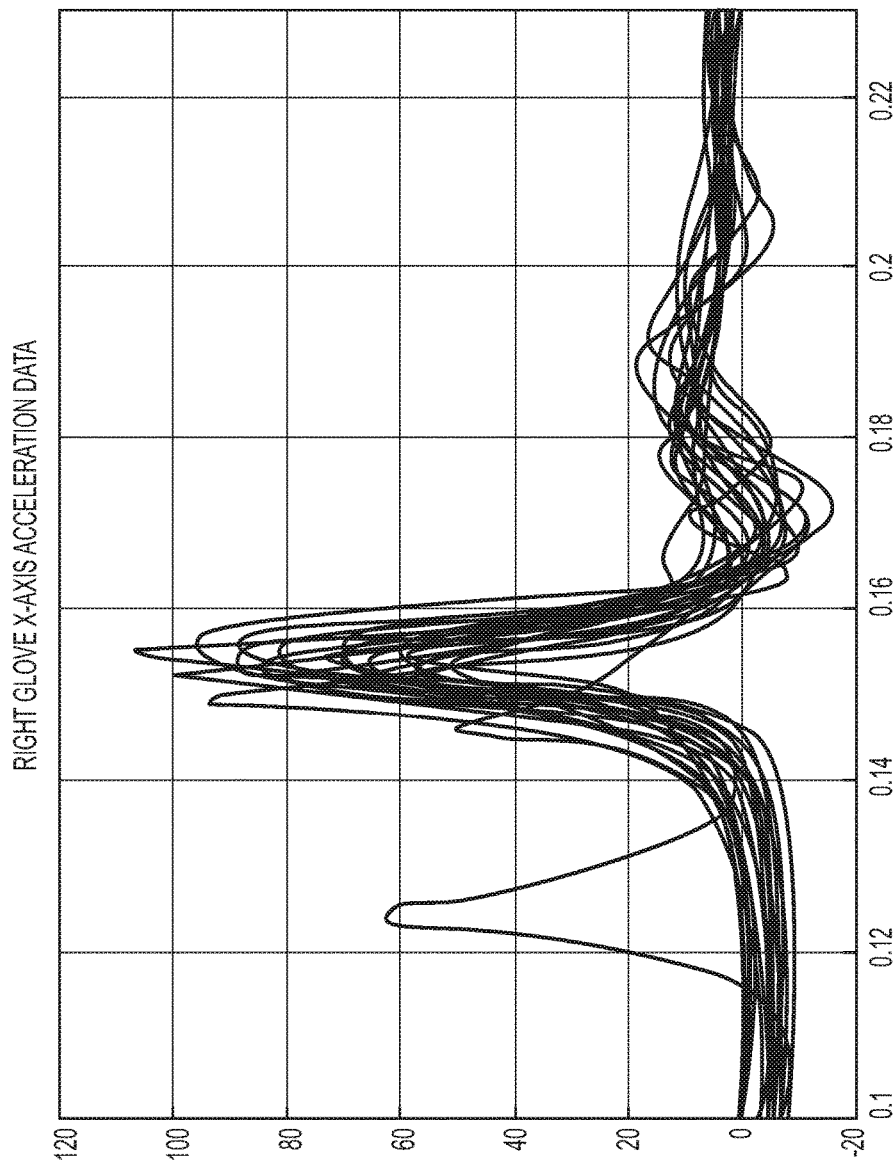
FIG. 24 shows an example of inertial measurement unit (IMU) data.
Figure 25:
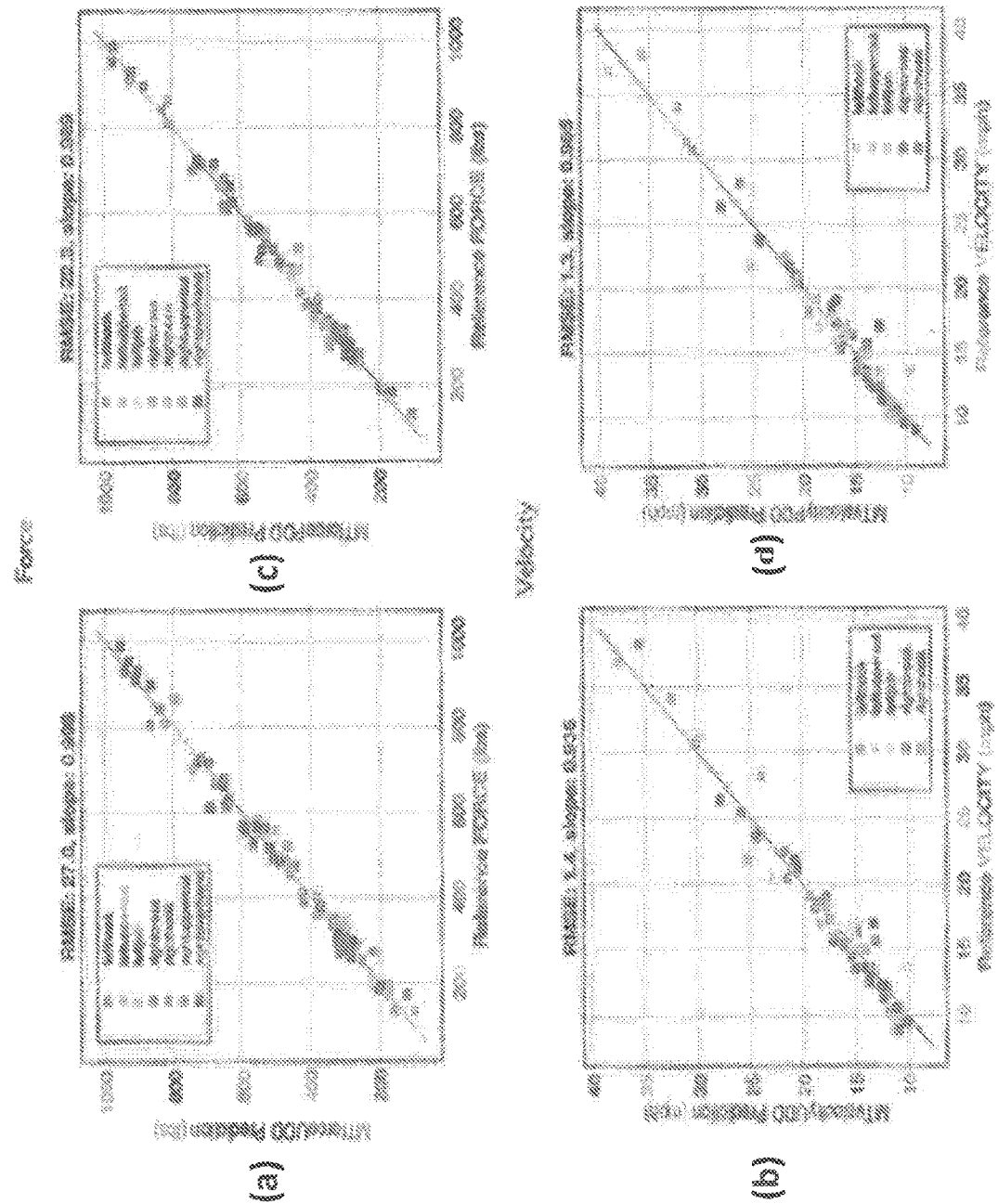
FIGS. 25(a)-(d) illustrate exemplary performance results.

In FIG. 24, the IMU data from 20 right crosses are shown. When viewing many punches from just one punch type, one observes significant variance in the initiation of a punch. Effective classification of punch type and quantification of force and velocity will therefore require methodologies to be insensitive to start and alignment variances.

With respect to force and velocity determination, there are two methods that may be used by algorithm 1100: theory driven and data driven. In the theory driven method, the primary observation is that the area under the curve (AUC) of acceleration during the initiation window is equivalent to the change in velocity, and is equal (and opposite) to the AUC during the impact. The impact force should be proportional to velocity, divided by the time over which the impact occurs. Hence, AUCs and window durations are features of interest for force and velocity determination for the theory driven method. Only the IMU sensors from the punching hand are utilized.

Unlike the theory driven method, the data driven method is not based upon a physics model. All IMU sensor data from both hands and the waist is utilized. Since the punch is characterized by both low and high frequency events, it is sensible to transform the IMU data from the time domain into the frequency domain. Instead of using AUCs and window durations in the time domain, algorithm 1100 may use a set of frequency coefficient magnitudes from a Fast or Discrete Fourier Transform. Other forms of transformation can be used such as wavelets, and other methods that effectively convert time domain information into the frequency domain or a similar representation.

In both the theory and data driven methods, algorithm 1100 may transform the raw IMU data into a compressed set of features—AUCs and window durations for the theory driven method and frequency coefficient magnitudes for the data driven method. Once one has this reduced set of features, algorithm 1100 may use a multivariate regression technique (e.g., Partial Least Squares)—utilizing both the set of features and obtained reference force (or velocity) measurements—to create a calibration model that can be subsequently applied to the IMU data of a novel punch.

Figure 26:
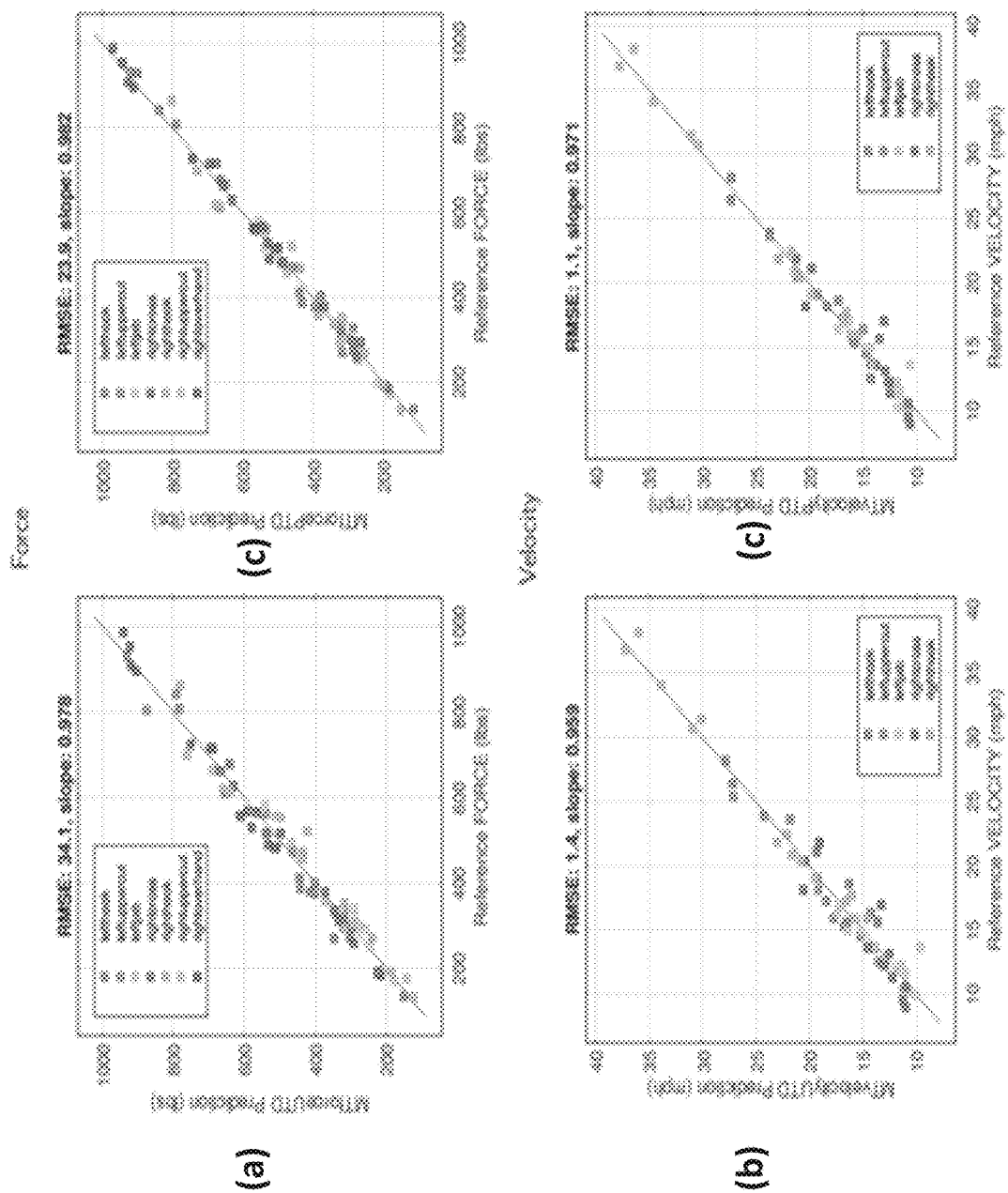
FIGS. 26(a)-(d) illustrate further exemplary performance results.

Algorithm 1100 may create different types of models using the theory and data driven methods. For example, punch-specific models may correspond to calibration models that are built from one punch type, e.g., a left-jab force (or velocity) model, a right-cross force (or velocity) model, and so on. A punch-specific model will then predict the force (or velocity) of a novel punch of the same type. As another example, a universal model may utilize all punches to calibrate a model. The universal model may predict the force (or velocity) of a novel punch of any type. The following acronyms will be used to designate the type of predictions based on models:

UDD: Universal Data Driven model
PDD: Punch-specific Data Driven models
UTD: Universal Theory Driven model
PTD: Punch-specific Theory Driven models FIGS. 25(a)-(d) illustrate several scatterplots associated with force (top row) and velocity (bottom row) predictions for the data driven models. The data driven performance for UDD and PDD are shown on the left and right columns, respectively. The x-axis of each scatterplot shows the reference force measurements while the y-axis measurements indicate the predictions. Similarly, FIG. 26 illustrates the scatterplots associated with the theory driven models (UTD and PTD).

The models developed and the results generated represent a particular example of a broad methodology for accurately determining the force and velocity of a punch. Other variants of the technology may include models that leverage the physical attributes of the boxer to include height, weight, arm span, etc. Additionally, sub-models based upon individual data characteristics as well as locally weighted regression methods can be used. Other data processing methods that leverage training data without reference information can be used and are broadly referred to as augmentation with unlabeled data.

Additionally, the performance results generated by the various methods can be combined or averaged to improve overall performance.

Vendors 108 continuously or periodically query punch information database 106 via a network interface 318 for new punch data objects that have the gesture, force, and/or velocity completed, and use the punch data objects to display punch statistics to the user, or for other purposes, as discussed below.

The system employs a number of clocks to ensure that the sensor data and other information can be properly correlated with one another. Each sensor typically has its own clock, such as an internal 32 kHz clock that increments from zero on boot. Each sensor clock may run independently, and the number of sensor clocks in use during data capture may vary depending on the number of sensors. Boxing data server 106 has its own internal clock, which may be a CPU clock or some other clocking mechanism within the server. Television production equipment, which may include cameras and audio/video post-processing equipment, also have their own timing reference via a Linear Timecode (or LTC) clock. The LTC clock is an external clock generated by the television production equipment, and any device used in production that requires time synchronization must read and report LTC time. The LTC clock is formatted to combine the current time (local or broadcast) with a video frame number.

Boxing data server 106 synchronizes all the clocks in the system to its own internal clock by running a linear regression on each external clock source. The result is a distributed, latency- and jitter-tolerant clock synchronization mechanism that uses standard networking protocols and requires few resources.

To synchronize the LTC clock, boxing data server 106 receives the LTC time at the highest rate possible and tags each reported time with the current server time to create a tuple in a database. The tuples are used to perform a least squares linear regression to determine the drift (slope) between the internal clock of boxing data server 106 and the LTC clock. Boxing data server 106 can then interpolate LTC time based on its own time and stamp any piece of information with an accurate LTC timestamp.

To synchronize the sensor clocks, each sensor sends data packets to boxing data server 106 at a specified rate, such as approximately 20 Hz. Each of those packets includes a timestamp that was applied at the last possible moment before being handed off to the wireless communication module for transmission. In most cases, upon arrival at boxing data server 106, the server combines that timestamp with the current time of the server's internal clock to create a tuple. Those tuples are then used to perform a least squares linear regression to determine the drift (slope) between the sensor clock and the server's internal clock. Boxing data server 106 can then accurately estimate the server time for any given sensor timestamp.

If the system experiences wireless transmission issues, boxing data server 106 may choose not to apply its current internal time to an incoming packet. If a packet arrives too soon or too late after the preceding packet, the sensor time in the packet is considered invalid. Timing variations can stem from several sources, such as the nature of wireless buffering on the sensor and the transmission protocol being used to transmit data, such as TCP. Regardless, because the sensors send data at a known rate, using these techniques allows boxing data server 106 to quickly determine the accuracy of the timestamp included in the sensor packet.

Once the LTC time and sensor time have been synced to boxing data server 106's internal time, events detected in the sensors can be easily tagged with an accurate LTC timestamp. If data is being captured in a system without an LTC clock, such as when the data is captured for calibration or for other non-broadcast uses, the same synchronization techniques may be applied to sensor clocks and the events detected in the sensors can be tagged with a different reference timestamp, such as the timestamp of the boxing data server 106's internal clock.

In systems where the data generated by a sensor is not produced at a predictable rate, thus precluding boxing data server 106 from accurately synchronizing the sensor clock with its own internal clock using the method above, an active synchronization mechanism may be used. The sensor may either actively sync its own time to the server's time or it may produce a periodic time synchronization packet. Similar to the linear regression method above, the server and sensor time will be tracked and interpolated. This may result in more accurate timestamps for events on the sensor, and it may allow for sensors to communicate between each other using accurate inter-sensor timestamps. If there is an LTC clock in the system, the server will still perform LTC synchronization and convert the server time reported with sensor events to LTC time. Those skilled in the art will recognize that other synchronization methods may also be used.

Although the data processing, punch gesture, and punch force/velocity functions are described as performed by boxing data server 106, some or all of these functions may be locally performed on punch sensor 204.

Punch Sensing System Calibration

To improve system accuracy, it may be calibrated for individual fighters, specific types of fighters, or using a more universal calibration. Several features can be calibrated to take into account, for example, different fighting styles. One can calibrate the punch type detection system to more accurately identify the types of punches thrown, calibrate the punch force measurements (optionally taking into account rotational energy transferred to the impact point), and calibrate detection of the maximum punch speed.

Multiple options are available to calibrate the punch type detection system. One option is to place one or more sensors on a fighter before a fight in a training environment. The fighter is then told to throw a specific type of punch. Sensor data is analyzed to determine a sensor signature for the punch type thrown by that particular fighter. The fighter may perform multiple iterations to get a collection of data that represents, for instance, the variations in how the fighter throws a right hook. The fighter can also be asked to throw the same punch from different angles.

Once the system captures a sufficient number of iterations, parameters in the punch type detection system are adjusted to more accurately recognize when a punch is thrown. Threshold values can be set to distinguish punches from other movements of the fighter's body. One could set a threshold for peak acceleration, for example, where a motion that exceeds the identified acceleration would be treated as a punch.

Parameters can also be adjusted to identify the type of punch thrown by the fighter. Parameters that can be adjusted include specifying ranges of input from one or more sensors on the fighter (e.g., ranges of acceleration and deceleration as read by the accelerometer(s)), relationships between different sensor readings (e.g., specifying correlations between readings on accelerometer(s), a magnetometer, a gyroscope, or other sensor on the fighter or the fighter's opponent), or incorporating additional decisional logic based on the specifics of the fighter's punch characteristics. Other data relevant to the calibration may also be used and stored in the calibration system, such as a fighter's height, weight, and handedness. This information may be stored in one or more separate database(s) from the punch sensor data or it could be stored in the same database(s) that store the sensor data.

Although it is not essential to identify relationships between the data provided across different sensors, doing so can improve the accuracy of the punch detecting algorithm by distinguishing between punches that may look similar across a subset of the sensors. As an example, a right hook may look similar to an uppercut from an acceleration and deceleration standpoint. However, when one takes into account the orientation information provided by other sensors, such as a magnetometer, a gyroscope, or both, it is easier to distinguish the two based on the punch's motion relative to known or measured axes in space.

Relationships between sensor data obtained from a fighter's right and left hands may also help distinguish punch types. Depending on the type of punch, some fighters will move their non-punching hand forward, backward, upward, downward, or in some other way, before throwing a particular punch type with the other hand. Determining the relationship between sensor data collected from the non-punching hand and sensor data collected from the punching hand on a per-fighter and per-punch-type basis can improve the accuracy of the punch type detection system. These relationships may also help distinguish a punch from other motions of a fighter that might otherwise appear to be punches when considering only more isolated, individual sensor data.

In a similar way, data from additional sensors, such as those mounted in a tail sensor module located on the back of a fighter, can provide additional data that may be used to calibrate punch type detection. The additional sensor data may be used in the first instance to identify a punch type. It may also serve a confirmatory role, where one or more sensors are first used to determine the punch type. Then additional sensor data from one or more additional sensors is used to check whether the detected punch type is consistent with that additional sensor data. Regardless of which method is used, parameters can be adjusted during calibration to identify punch type signatures in the sensor data to further improve the accuracy of the punch type detection system.

Once the fighter has provided a sufficient number of iterations to reflect the variations one might see in the sensor data for a given punch type, the fighter can move on to another punch type for a similar data collection process. This continues until the system captures a sufficient amount of data to calibrate detection of all desired punch types.

Instead of capturing data from a series of the same type of punch, the fighter could vary the order in which the punches are thrown. Asking the fighter to throw varying sequences of punches may help capture additional variability in the way a fighter throws a given punch. As an example, a fighter might throw a right hook a bit differently after throwing a series of jabs than after he has thrown a prior right hook. By having the fighter throw varying sequences of punches, preferably in quick succession, the system can be calibrated to detect these differences. Because the prior punch or punches thrown by a fighter can affect the characteristics of a subsequently thrown punch, the system may be calibrated to recognize these differences and analyze a given punch by looking at its sensor data in connection with the sensor data or computed values based on sensor data obtained from prior punches.

Another option for calibrating the system is to have the fighter wear sensors while sparring in a training environment. An observer may watch the sparring for a specific type of punch to be thrown. Once the observer notices a desired punch type, the data associated with that punch can be flagged as relating to the type of punch thrown. The observer may watch the sparring in real time or may watch a (preferably timecoded) video of the sparring. This method has the advantage of capturing the data in a more realistic, fight-like situation than if the fighter is simply asked to throw a specific type of punch. It also permits the system to be calibrated to distinguish punches from other forms of motion, as a sparring environment is more likely to have the fighter moving around the ring than simply asking the fighter to throw some punches, as described above.

The closer one gets to calibrating in a true fight environment, the more accurate the results are likely to be in an actual match. Sparring, however, typically occurs under conditions that are not the same as an actual fight. Among other differences, sparring gloves have different weights than match gloves and fighters wear headgear while sparring.

For those who want to calibrate under match conditions, a fighter may wear sensors during an actual match. The collected data may be analyzed in real time, permitting on-the-fly calibration of the system from round to round. The data may also be stored and analyzed later in a way that is similar to how the sparring data is analyzed for calibration. Either way, the system may be calibrated under match conditions.

A boxer's punches may change over the course of a match as the boxer fatigues and is unable to throw punches with the same technique as when the boxer was fresh. Thus, changing calibration profiles throughout a match or building calibration profiles that take into account match timing or other indicia of a fighter's state of exhaustion may more accurately measure aspects of a fighter's performance. For example, gesture data for a boxer's hook may easily identify a hook at the start of the match, but may do so with less reliability in later rounds as the boxer's technique deteriorates or otherwise changes. Data may be collected over the course of a match, run through multiple punch segmentation, gesture, force, and velocity algorithms, and processed with regression analysis to identify which algorithms or filters perform better at the different stages of the fight, or to select or refine the variables used in these algorithms at different stages of the match. In subsequent matches or rounds, the identified algorithms or variables may be applied to segment punches and to determine gesture, force, and velocity of punches with greater reliability. As an example, a given boxer's uppercut may show less rotation around a certain axis as the boxer fatigues. As a result of the analysis, the uppercut gesture model for that boxer in later rounds may place less emphasis on the measured rotation and more emphasis on, for example, gross movement by changing the relative weights applied to these variables.

The system may also be calibrated to more accurately detect peak punching velocity. This may be accomplished in a number of ways. One way is to record a fighter throwing a punch, preferably using a high-speed camera that captures video at a high enough frame rate to discern the distance a fighter's hand moves from frame to frame. To help determine the distance, a visual grid may be placed behind or beside the fighter where the grid has markings at known distances apart, such as every one inch. By viewing the video frame by frame just before the punch is landed, one can identify the distance the hand traveled from one frame to the next. By knowing the time that elapses between each frame, one can compute the speed of the punch by dividing the distance traveled by the time it took to travel that distance.

Depending on the circumstances, however, this method may present challenges in assessing the speed. It may be difficult to view the grid when a fighter throws certain punch types. It may also be difficult to capture the images necessary at a high enough frame rate and resolution to ensure accurate calibration. It is more conducive to determining an average velocity throughout a punch than it to determining the velocity just before impact, which is often the peak velocity. Thus, while this calibration method may be suitable in some circumstances, applicants have developed another method that may result in more accurate measurements and calibration under other circumstances.

An alternative method of measuring peak velocity involves using two sets of lasers. The lasers are used to create "curtains" that can detect when an object, such as a boxing glove, passes through their detection fields. A first laser curtain is established just in front of a target. The exact distance can vary, but a distance of 1 mm from the target achieves useful results. A second laser curtain parallel to the first is also established in front of the target, but it is positioned farther away from the target. Those skilled in the art will recognize that this distance may also vary, but a distance of 1 cm from the first laser curtain achieves useful results. The fighter is then told to punch the target. The system captures the time when the boxer's glove passes through the laser curtain farthest from the target. It then captures the time when the boxer's glove passes through the laser curtain closest to the target. Because the distance between the laser curtains is known, one can calculate the velocity of the punch just before hitting the target by dividing the distance between the two laser curtains by the time it took for the glove to pass through both curtains.

Although this measurement technique refers to laser curtains, the use of lasers is not critical. Any suitable system for detecting when an object has passed through a space may be used, including the use of sonar, radar, or optical techniques other than lasers, such as using infrared beams.

Once the system has determined the peak velocity based on its reference detection system, the data can be used to calibrate the punch velocity detection system using data collected from the sensors on the boxer. For some applications, acceleration and deceleration data may be sufficient to accurately detect the peak velocity. For other applications, where even higher accuracy may be desirable, the system may also rely on the data collected from other sensors. The calibrator may adjust the detection parameters related to one or more of the sensors until the peak velocity detected by the sensors matches the peak velocity measured on the reference velocity detection system. The match need not be exact but the calibration should result in the sensor-detected value being close enough to the reference-measured value to be within a desired margin of error. As with the punch type detection, this process may require multiple iterations to take into account the variability in the punch types and fighting styles. Once the desired margin of error is achieved, the calibration is saved and can be used for detecting punch velocity using the fighter's sensors.

To calibrate punch force detection, a fighter strikes a force plate load cell fronted with ballistics gel. The measured force is compared to the calculated force obtained from the sensor data on the fighter. Similar to the other calibration methods disclosed above, if the calculated force differs from the measured force, a calibrator may adjust system parameters until the calculated force is within a desired margin of error from the reference force measured by the load cell. Data from various iterations of the same punch type and from iterations of different punch types may all be provided to the calibrator to improve the accuracy of the punch force detection system.

Although the above methods discuss calibrating the system for each fighter, the system may be calibrated for particular fighting and punching styles. One could have, say, ten calibrations based on analyzing ten fighters who each have different fighting and punching styles. Instead of analyzing future fighters using the entire calibration regimen, a calibrator could identify the pre-existing calibration that most closely tracks the fighter's style. This could be determined by asking the fighter or a fighter's advisor to examine the calibrated styles and identify the one that appears to most closely match the fighter in question. Another option is to collect a more limited set of data from a new fighter, such as by having them throw a small number of each punch type, and then comparing the data to the existing calibrations. The one that most closely resembles the fighter could be used moving forward. This approach is likely to be less accurate than developing an entire calibration profile for a fighter, but it may prove useful if a fighter does not have the time or resources to obtain a full calibration, or simply chooses not to seek a more detailed calibration.

A universal calibration may also be applied to fighters who choose not to seek any calibration or do not have access to a calibration system. The universal calibration is developed by identifying detection parameters that would achieve a reasonable level of accuracy for a significant percentage of the fighters who have performed individual calibrations. In a sense, the universal calibration is looking for lowest common denominators across fighters and setting the calibration parameters accordingly. The universal calibration is likely to be less accurate than the other methods mentioned above. Therefore, it may be most useful in consumer product embodiments of the disclosed inventions, where the highest accuracy levels are not necessary.

The accuracy of a system may increase over time as more data is obtained for calibration. Depending on the intended use, the target accuracy level may be greater than 75%, greater than 85%, or greater than 90%, if calibration is tuned to a specific fighter. The meaning of "accuracy," however, can mean different things for differ detected features. For punch type detection, an accuracy of 75% means that the punch detecting system correctly identified the punch type 75% of the time. This is because the punch detection system is either correct or incorrect for each punch. For features with measured values, however, accuracy is defined as one minus the percentage deviation from the true value as measured by a reference system. For example, if a punch is measured to have 1000 pounds of force using the reference system but the fighter's sensor-based system detected 900 pounds of force, there is a deviation of 100 pounds from the true value. This is 10% of the reference value, so the accuracy is 1-10%, or 90%.

Embodiments disclosed above may be used in a number of applications. One application is to obtain data during a match or round that can be announced or displayed for entertainment purposes. For example, in a boxing match, announcers or visual displays on a screen can provide data regarding the number of punches thrown, number of punches landed, types of punches thrown, forces of the strongest or weakest punches in a round, the force of a specific punch (such as a punch that caused a fighter to fall to the mat), accumulated force delivered throughout a round or a match, stamina (measured, for example, by comparing punch forces in early rounds to those in later rounds), and other data or statistics that may enhance the enjoyment of someone listening to or watching a fight.

The data or statistics may also provide information about trends across matches, painting a picture of how a fighter's style, technique, and strength has evolved over time. They may also help identify whether boxers change their style when fighting different opponents, such as by identifying a change in the punch types delivered to different opponents or a change in how the fighter moves around the ring from match to match.

The data and related statistics may be announced or displayed in real time or shortly after they are measured or calculated during a fight. They may also be stored in a longer-term storage medium for use after the fight in which they were collected. One use for the saved data is for comparison purposes between fights. The historical data may be used to compare a fighter's performance in one fight with his or her performance in one or more previous fights. It could also be used on sports memorabilia or sports cards. Much like statistics are shown on baseball trading cards, trading cards for boxers could set forth information on peak punch strength (as measured by peak punching force in a match), average punch force delivered in a match, stamina, and any other data or statistic that a fan or collector may find interesting, such as the other measured data or computed statistics discussed elsewhere in this disclosure.

Those skilled in the art will recognize that the data and statistics may be announced or displayed in any fashion that listeners or viewers would find interesting. One example is for an announcer to orally provide punching data/statistics and then discuss whether that information fits any trends based on the current match or one or more prior matches. Another option is to visually present the information on a screen, such as by presenting the data or statistics in tabular form. Graphs showing performance over a round or across matches are another option. The images could be displayed on a television, arena screen, computer screen, tablet, wrist watch, phone, augmented reality glasses, or any other suitable display device. They could be shown by themselves or overlaid on other images or video, such as footage of the fighter throwing the punches being described by the data or statistics. Another option is to combine a visual and oral presentation, with an announcer describing data or statistics that are also displayed.

The data and statistics could also be provided during a match to trainers, coaches, and others affiliated with a fighter (collectively "advisors"). The advisors could use the information, for example, to advise their fighter on how to proceed during a match, gauge performance during the match, determine how much force has likely been absorbed by their fighter throughout a match, and assess characteristics of an opposing fighter. Temporal punch statistics, such as punch-type/gesture distribution, punch-type velocities, etc., could be used to identify evolving strategies or weaknesses. For example, an opponent may be slowing down or throwing more of one type of punch to protect a weakness or injury. The data and statistics could be used alone or in conjunction with visually observing the fight to further assist their fighter.

The data and statistics could also be provided to judges evaluating the fight. Given boxing's fast-paced nature and that humans score the rounds using their judgment, there can be variations from match to match and from judge to judge in how fights are scored. By providing the data and statistics to the judges during a match, more uniformity across judges and matches may be achieved. If a boxing circuit wishes, they could develop standards that are based on the data or statistics either alone or in conjunction with other information the judges see while viewing a fight. For example, the data and statistics could be used to help assess punch counts, punch forces, punch types, ringsmanship, or any other measured or computed factor that the judges might wish to take into account in evaluating a fight.

The data and statistics could also be used in the gaming industry. They may be made available to gaming establishments to help them set betting lines. They could also open up new gaming options, such as betting on who will land the strongest punch, who will deliver the most force throughout a round or match, who will deliver the most punches of a certain type, who will block the most punches, or any other measured or computed factor. Variations could include providing an over/under line or other known betting games that will take on new dimensions based on the information provided through the disclosed systems and methods.

The data and statistics may also be provided to a medical service provider, such as a doctor or healthcare organization, to evaluate the health of the fighter over time. For example, impact trauma is an area of continued medical study. Combining the fight impact data and statistics with health data from other sources, such as medical examinations, may be useful in the short term in deciding on a training regimen and whether a fighter is ready for his or her next fight. Over the longer term, medical professionals can gain a better picture of how impact trauma affects a fighter's body and mental acuity. The disclosed systems and methods provide more data and better quality data than has been available to date, allowing new types of analysis that may aid individual fighters and the industry as a whole.

Fight data and statistics can also be used in training. A trainer can use recent fight data and statistics to identify weak performance areas and adjust the training regimen to strengthen those weaker areas. If sensors are worn during training, the trainer can also evaluate a fighter's progress in weaker areas in real time. He can also ensure that formerly strong performance areas have not weakened recently. The training regimen can be adapted based on prior performance, current performance, or both. The trainer could also take into account the impact a fighter has received in fights or during training. For example, if a fighter receives a significant force during training, the trainer can recognize this fact and adjust the training regimen for that day to avoid further significant impacts, if desired.

When used during training, sensors may optionally be mounted in a fighter's headgear. In this configuration, impact force to the head could be measured regardless of whether the opposing fighter also wears punch sensors. If the opposing fighter does wear punch sensors, then the headgear sensors may be used to gather additional information not available from the opposing fighter's punch sensors, such as head rotation information. The headgear sensors could include any of the sensors discussed in this disclosure. They are preferably mounted in a location that is not likely to receive a direct impact force or is padded in such a way as to avoid harming the fighter and the device if directly hit. The sensors may transmit their data via wire or wirelessly using any known protocol or technology, including those identified elsewhere in this disclosure (e.g., Bluetooth, Bluetooth Low Energy, WiFi, etc.). The particular radio hardware used may depend upon the intended application. For example, a shortwave radio such as Bluetooth may be adequate in consumer applications where frequency agility and transmission reliability is less of a concern than in professional environments, and may also reduce the size or cost of the consumer device. Headgear sensors could also be used to monitor and protect the health of a boxer. For example, impact data from headgear sensors can be cumulatively logged in a training record for a given boxer to monitor and protect against potential concussions or other injuries. This data can be used to determine appropriate suspensions from full contact in training or matches, modifications to training regimens, periods of rest, etc.

Embodiments of the invention may be used in any suitable context, such as professional fighting, semiprofessional fighting, or in consumer applications. Consumer versions may be tuned to have different attributes from professional and semiprofessional embodiments. For example, to achieve a desirable consumer price point and because accuracy may not be as critical in consumer applications, consumer embodiments may be less accurate in their readings, have a less specific calibration, or provide less data. However, additional consumer-friendly features may be added, such as the ability to send the captured data to a cloud storage service for use by an application running on a smart device, such as a phone or tablet computer. The data may also be provided directly to a smart device in real time, or could be transferred in a batch after buffering in the sensor system. One skilled in the art recognizes that other modifications may be implemented without departing from the spirit of the inventions.

While many of the embodiments disclosed above refer to boxers or fighters, the disclosed embodiments may also be used in any sport where impact forces or specific body motions are relevant concerns for those participating in the sport, those assisting the people participating in the sport (e.g., coaches, trainers, medical professionals, etc.), or those viewing the sport. Embodiments of the inventions may be used, for example, in boxing, wrestling, kickboxing, mixed martial arts, martial arts (e.g., karate, judo, taekwondo, jiu jitsu, muay thai, etc.). Sensors may be placed in any location on the participant's body that is likely to result in the collection of useful data. In kickboxing and other sports where leg motion and impact force may be of interest, for example, ankle-mounted sensors may be worn in addition to or instead of wrist-mounted sensors. While many of the descriptions in this disclosure pertain to punching, the same teachings can be applied to capturing, analyzing, and calibrating the system for kicks and other body motions.

It is preferred to place sensors on at least two extremities of a participant, but any number of sensors may be used. More sensors generally provide additional data, which may increase the accuracy of the system, but those skilled in the art will recognize the need to balance a participant's comfort and safety with the desire to capture data at as many points as possible on the participant's body.

The performance of the system may improve by training or designing the system to work on only one individual versus a broader population. For example, the system may either require the user to train the system prior to use or utilize corrections as a tool to improve overall performance. The system may incorporate individual user performance characteristics to enhance overall performance.

In the case of a system for overall assessment of boxer performance, the system described can be trained and developed for use on only one individual. This type of individual training would create a custom predicting methodology for gesture, force, and velocity. Individualized training can result in a performance that is better than a general system that works across an entire population. The development of the system for use across an entire population, often referred to as a universal measurement system, can also be achieved via the methodologies articulated in this disclosure.

Depending upon the end-use application, availability of training data, and desired performance, a multitude of options exist when transitioning between an individual specific performance assessment system and one that works on the general population. For example, a system for lightweight fighters, middleweight fighters and heavyweight fighters could be developed. An additional example would be to develop systems for left and right-handed fighters, etc. The methodologies disclosed herein can be applied to these various training groups for the development of systems that effectively characterize the performance of the boxer.

While many of the embodiments disclosed above refer to boxers or fighters, the disclosed embodiments may also be used in any sport where impact forces or specific body motions are relevant concerns for those participating in the sport, those assisting the people participating in the sport (e.g., coaches, trainers, medical professionals, etc.), or those viewing the sport. Embodiments of the inventions may be used, for example, in boxing, wrestling, kickboxing, mixed martial arts, martial arts (e.g., karate, judo, taekwondo, jiu jitsu, muay thai, etc.). Sensors may be placed in any location on the participant's body that is likely to result in the collection of useful data. In kickboxing and other sports where leg motion and impact force may be of interest, for example, ankle-mounted sensors may be worn in addition to or instead of wrist-mounted sensors. While many of the descriptions in this disclosure pertain to punching, the same teachings can be applied to capturing, analyzing, and calibrating the system for kicks and other body motions.

One of ordinary skill in the art will appreciate that computer programs for implementing aspects of the disclosure may be stored on and/or read from computer-readable storage media. The computer-readable storage media may have stored thereon computer-executable instructions which, when executed by a computer processor, cause the computer to perform, among other things, processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted based on the language employed in the claims and not limited by examples described in the present specification or during the prosecution of the application. Further, the steps or processes of the disclosure may be modified in any manner, including by reordering steps, inserting steps, deleting steps, or having steps or functions performed by other entities in the system, without departing from the principles of the disclosure.

It is intended, therefore, that the specification and examples be considered as exemplary only, with a true scope and spirit of the disclosure being indicated by the following claims and their full scope of equivalents.

We claim:

1. A punch sensor, comprising:
   a first acceleration sensor for measuring a first range of acceleration of a boxer's arm, wherein the first acceleration sensor is configured to detect that a punch has landed but not to determine a speed or a force of the punch;
   a second acceleration sensor for measuring a second range of acceleration of the boxer's arm, wherein the second acceleration sensor is configured to determine at least one of the speed or the force of the punch but not to detect that a punch has landed; and
   a processor configured to receive the measurements of the first range of acceleration from the first acceleration sensor and to receive the measurements of the second range of acceleration from the second acceleration sensor.

2. The punch sensor of claim 1, further comprising a radio for communicating with a boxing data server, wherein the processor is configured to transmit the measurements of the first range of acceleration and the second range of acceleration to the boxing data server via the radio.

3. The punch sensor of claim 1, further comprising a gyroscope sensor for measuring a rotation of the boxer's arm, wherein the processor is further configured to receive the measurement of the rotation of the boxer's arm from the gyroscope sensor.

4. The punch sensor of claim 3, further comprising a radio for communicating with a boxing data server, wherein the processor is further configured to transmit the measurement of the first range of acceleration, the measurement of the second range of acceleration, and the measurement of the rotation of the boxer's arm to the boxing data server via the radio.

5. The punch sensor of claim 3, further comprising a direction sensor for measuring the punch sensor's direction in a reference coordinate system, wherein the processor is further configured to receive the measurement of the punch sensor's direction in the reference coordinate system from the direction sensor.

6. The punch sensor of claim 5, wherein the processor is further configured to determine a rotation of the boxer's arm in the reference coordinate system based on the gyroscope's measurement of the rotation of the boxer's arm and the direction sensor's measurement of the punch sensor's direction in the reference coordinate system.

7. The punch sensor of claim 6, further comprising a radio for communicating with a boxing data server, wherein the processor is further configured to transmit the measurement of the first range of acceleration, the measurement of the second range of acceleration, and the measurement of the rotation of the boxer's arm in the reference coordinate system to the boxing data server via the radio.

8. The punch sensor of claim 1, wherein the punch sensor is configured to be worn on the boxer.

9. The punch sensor of claim 8, further comprising a strap for fastening the punch sensor to the boxer's forearm or wrist.

10. The punch sensor of claim 8, wherein the punch sensor is integrated within a boxing glove.

11. A boxing data server, comprising
    a memory storing predetermined profiles of arm acceleration or rotation over time for one or more types of punches;
    a radio for communicating with one or more punch sensors on one or more boxers and receiving sensor values from the one or more punch sensors;
    one or more processors configured to:
      receive, via the radio from the one or more sensors, one or more streams of sensor values indicating accelerations of a boxer's arm or rotation of the boxer's arm within a first range of acceleration, measured by a first acceleration sensor or a gyroscope sensor, and receive values indicating accelerations of a boxer's arm or rotation of the boxer's arm within a second range of acceleration, measured by a second acceleration sensor or a second gyroscope sensor;
      determine, based on the received sensor values from the first acceleration sensor, whether a punch landed but not to measure a force or velocity of the punch; and
      determine, based on the received sensor values from the second acceleration sensor, the force or velocity of the punch but not to detect whether the punch landed.

12. The boxing data server of claim 11, wherein the one or more processors are further configured to:
    determine whether one or more sensor values from the first acceleration sensor indicate an acceleration above a threshold or indicate that the first acceleration sensor is saturated; and
    if it is determined that one or more sensor values from the first acceleration sensor indicate an acceleration above a threshold or indicate that the first acceleration sensor is saturated, determining that a punch by the boxer has impacted.

13. The boxing data server of claim 12, wherein the one or more processors are further configured to:
    identify a set of sensor values from the second acceleration sensor preceding in time the sensor values indicating an acceleration above the threshold or indicating that the first acceleration sensor is saturated; and
    determining a gesture of the impacted punch based on the set of sensor values.

14. The boxing data server of claim 13, wherein the one or more processors are further configured to:
    determine whether the set of sensor values includes sensor values corresponding to a local peak acceleration prior to a maximum acceleration;

if it is determined that the set of sensor values includes sensor values corresponding to a local peak acceleration prior to a maximum acceleration, determining that the gesture of the impacted punch is a landed punch; and if it is determined that the set of sensor values does not include sensor values corresponding to a local peak acceleration prior to a maximum acceleration, determining that the gesture of the impacted punch is a blocked punch.

15. The boxing data server of claim 13, wherein the sensor values received via the radio further include sensor values indicating rotation of the boxer's arm measured by a gyroscope sensor, and the one or more processors are further configured to:

determine, based on sensor values within the set indicating rotation of the boxer's arm, a rotational speed of the boxer's arm prior to a maximum acceleration;

if the rotational speed of the boxer's arm prior to the maximum acceleration is above a threshold, determine that a gesture of the punch is a landed punch; and if the rotation speed of the boxer's arm prior to the maximum acceleration is not above a threshold, determine that the gesture of the punch is a blocked punch.

16. The boxing data server of claim 13, wherein the sensor values received via the radio further include sensor values indicating rotation of the boxer's arm measured by a gyroscope sensor, and the one or more processors are further configured to:

determine, based on sensor values within the set indicating rotation of the boxer's arm, a rotational speed of the boxer's arm prior to a maximum acceleration;

if the rotational speed of the boxer's arm prior to the maximum acceleration is above a threshold or fits a polynomial curve, determine that a gesture of the punch is a rotational punch; and if the rotation speed of the boxer's arm prior to the maximum acceleration is not above a threshold or does not fit a polynomial curve, determine that the gesture of the punch is a linear punch.

17. The boxing data server of claim 16, wherein the sensor values received via the radio further include sensor values indicating rotation of the boxer's hips or trunk, and the one or more processors are further configured to further determine whether the gesture of the linear punch is a jab or a cross based on whether sensor values in the set indicate rotation of the boxer's hips or trunk above a threshold.

18. The boxing data server of claim 16, wherein the one or more processors are further configured to:

receive, via the radio, information identifying a particular punch sensor of the one or more punch sensors that measured the punch; and based on the identification of the particular punch sensor, further determining that the gesture of the linear punch is a jab or a cross.

19. The boxing data server of claim 16, wherein the one or more processors are further configured to:

determine whether the set of sensor values indicates a change in direction of rotation of the boxer's arm prior to a maximum acceleration;

if it is determined that the set of sensor values indicates a change in direction of rotation of the boxer's arm prior to a maximum acceleration, further determining that the rotational punch gesture is a hook.

20. The boxing data server of claim 19, wherein the one or more processors are further configured to:

determine whether the set of sensor values indicates a change in direction of rotation of the boxer's arm prior to the maximum acceleration;

if it is determined that the set of sensor values does not indicate a change in direction of rotation of the boxer's arm prior to the maximum acceleration, further determining that the rotational punch gesture is an uppercut.

21. The boxing data server of claim 20, wherein the one or more processors are further configured to determine that that rotational punch gesture is an over hand if it determined that the rotational punch gesture is neither a hook nor an uppercut.

22. The boxing data server of claim 13, wherein the one or more processors are further configured to determine at least one of a force and a maximum velocity of the punch based on the sensor values from the second acceleration sensor.

23. The boxing data server of claim 22, wherein the one or more processors are further configured to store at least one of the force, the maximum velocity, or the punch gesture in a punch information database for access by third-party systems for display of punch statistics.

24. The boxing data server of claim 11, wherein the one or more processors are further configured to facilitate display of an audience dashboard illustrating the determined force or velocity of the punch and the determination of whether the punch landed.

25. A boxing data server, comprising
a radio for communicating with one or more punch sensors on one or more boxers and receiving sensor values from the one or more punch sensors;
one or more processors configured to:
receive, via the radio, sensor values indicating: (1) accelerations of a boxer's arm within a first range of acceleration, measured by a first acceleration sensor, (2) accelerations of a boxer's arm within a second range of acceleration, measured by a second acceleration sensor, and (3) rotation of the boxer's arm measured by a gyroscope sensor;
determine, based on the received sensor values from the first acceleration sensor, whether a punch landed but not to measure a force or velocity of the punch;
determine, based on the received sensor values from the second acceleration sensor, at least one of a force or a velocity of the punch but not to detect whether the punch landed; and
determine, based on comparison of variations in the rotation of the boxer's arm and on variations in the acceleration of the boxer's arm measured by the second acceleration sensor to known punch gestures, a type of the punch.

26. The boxing data server of claim 25, wherein the one or more processors are further configured to facilitate display of an audience dashboard illustrating at least one of the determined at least one of force or velocity of the punch, the determination of whether the punch landed, and the determination of the type of punch.

* * * * *